US012473191B2

(12) United States Patent
Marshall et al.

(10) Patent No.: US 12,473,191 B2
(45) Date of Patent: Nov. 18, 2025

(54) REFILLING SYSTEMS, REFILLABLE CONTAINERS AND METHOD FOR REFILLING CONTAINERS

(71) Applicant: GOJO Industries, Inc., Akron, OH (US)

(72) Inventors: Aaron D. Marshall, Silver Lake, OH (US); Nick E. Ciavarella, Seven Hill, OH (US); John J. McNulty, Broadview Heights, OH (US); Matthew J. Archer, Aurora, OH (US); Emily Barbara Kennedy, Cleveland, OH (US); Bradley L. Lightner, North Canton, OH (US); Richard E. Corney, Akron, OH (US); Jason Fokens, Brecksville, OH (US); Chet J. Bonner, Independence, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 18/522,342

(22) Filed: Nov. 29, 2023

(65) Prior Publication Data

US 2024/0109764 A1 Apr. 4, 2024

Related U.S. Application Data

(60) Continuation of application No. 17/568,917, filed on Jan. 5, 2022, now Pat. No. 11,866,320, which is a
(Continued)

(51) Int. Cl.

*B67D 7/02* (2010.01)
*A47K 5/12* (2006.01)
(Continued)

(52) U.S. Cl.

CPC .......... *B67D 7/0294* (2013.01); *A47K 5/1202* (2013.01); *B05B 11/0056* (2013.01);
(Continued)

(58) Field of Classification Search

CPC .. A47K 5/1202; B67D 7/0294; B67D 7/3227; B67D 7/38; B67D 7/62; B67D 7/74; B67D 7/78; B05B 11/0056

See application file for complete search history.

(56) References Cited

U.S. PATENT DOCUMENTS

| | | | |
|---|---|---|---|
| 1,851,338 | A | 3/1932 | Wemple |
| 2,089,214 | A | 8/1937 | Lomax |

(Continued)

FOREIGN PATENT DOCUMENTS

| | | | |
|---|---|---|---|
| CA | 2932419 A1 | 6/2015 |
| WO | 2017033004 A1 | 3/2017 |
| WO | 2017078692 A1 | 5/2017 |

OTHER PUBLICATIONS

Invitation to Pay Additional Fees from PCT/US2018/022334 dated Jun. 12, 2018 (15 pages).

(Continued)

*Primary Examiner* — Timothy L Maust
(74) *Attorney, Agent, or Firm* — Calfee, Halter & Griswold LLP

(57) ABSTRACT

Exemplary sanitary soap refilling systems and methods are disclosed herein. An exemplary refill refilling system includes a housing, a pump located within the housing, and a bulk storage tank connector. The bulk storage tank connector having a liquid outlet and an air inlet. A liquid inlet conduit is in fluid communication with the pump the liquid outlet. A refill connector is included. The refill connector has a liquid inlet and an air outlet. The refill connector air outlet and the bulk storage tank connector air inlet are in fluid
(Continued)

communication with one another. The refill liquid inlet is in fluid communication with the pump.

19 Claims, 32 Drawing Sheets

Related U.S. Application Data continuation of application No. 17/184,682, filed on Feb. 25, 2021, now Pat. No. 11,220,420, which is a division of application No. 15/920,826, filed on Mar. 14, 2018, now Pat. No. 10,961,107.

(60) Provisional application No. 62/531,926, filed on Jul. 13, 2017, provisional application No. 62/511,687, filed on May 26, 2017, provisional application No. 62/471,011, filed on Mar. 14, 2017.

(51) Int. Cl.

| | |
|---|---|
| ***A47K 5/14*** | (2006.01) |
| ***B05B 11/00*** | (2023.01) |
| ***B67D 7/32*** | (2010.01) |
| ***B67D 7/38*** | (2010.01) |
| ***B67D 7/62*** | (2010.01) |
| ***B67D 7/74*** | (2010.01) |
| ***B67D 7/78*** | (2010.01) |

(52) U.S. Cl.

CPC ............. *B67D 7/3227* (2013.01); *B67D 7/38* (2013.01); *B67D 7/62* (2013.01); *B67D 7/74* (2013.01); *B67D 7/78* (2013.01); *A47K 5/12* (2013.01); *A47K 5/14* (2013.01)

(56) References Cited

U.S. PATENT DOCUMENTS

| | | | |
|---|---|---|---|
| 2,558,312 | A | 6/1951 | Nisbet |
| 3,207,387 | A | 9/1965 | Brickman |
| 4,018,363 | A | 4/1977 | Cassia |
| 4,196,163 | A | 4/1980 | Finkensiep et al. |
| 4,576,313 | A | 3/1986 | Smith et al. |
| 5,046,320 | A | 9/1991 | Loose et al. |
| 5,133,482 | A | 7/1992 | Burrows et al. |
| 5,174,343 | A | 12/1992 | Rood |
| 5,230,374 | A | 7/1993 | Dawson et al. |
| 5,767,775 | A | 6/1998 | Shukla et al. |
| 5,878,767 | A | 3/1999 | Etling et al. |
| 6,036,055 | A | 3/2000 | Mogadam et al. |
| 6,065,649 | A | 5/2000 | Scoggins |
| 6,227,263 | B1 | 5/2001 | Kust et al. |
| 6,302,574 | B1 | 10/2001 | Chan |
| 6,471,089 | B2 | 10/2002 | Liff et al. |
| 6,557,729 | B2 | 5/2003 | Gauthier |
| 6,601,782 | B1 | 8/2003 | Sandholm et al. |
| 6,691,932 | B1 | 2/2004 | Schultz et al. |
| 6,945,286 | B2 | 9/2005 | Freeman |
| 7,196,624 | B2 | 3/2007 | Teller |
| 7,997,511 | B2 | 8/2011 | Reynolds et al. |
| 8,085,155 | B2 | 12/2011 | Prodanovich et al. |
| 8,100,299 | B2 | 1/2012 | Phelps et al. |
| 8,240,508 | B2 | 8/2012 | Wegelin et al. |
| 8,393,360 | B2 | 3/2013 | Brakefield et al. |
| 8,578,974 | B2 | 11/2013 | Bonner |
| 8,622,242 | B2 | 1/2014 | Pelfrey |
| 9,237,831 | B1 | 1/2016 | Luu et al. |
| 9,611,839 | B2 * | 4/2017 | McNulty .................... F04B 7/00 |
| 10,022,023 | B2 * | 7/2018 | Santoro ............... B05B 11/0044 |
| 10,160,590 | B2 * | 12/2018 | Wells ..................... B65D 83/38 |
| 10,961,107 | B2 | 3/2021 | Marshall et al. |
| 11,220,420 | B2 | 1/2022 | Marshall et al. |
| 2006/0151531 | A1 | 7/2006 | Tikusis |
| 2008/0054018 | A1 | 3/2008 | Stechschulte et al. |
| 2008/0131332 | A1 | 6/2008 | Nguyen et al. |
| 2009/0204256 | A1 | 8/2009 | Wegelin |
| 2009/0226494 | A1 | 9/2009 | Hickok |
| 2010/0204323 | A1 | 8/2010 | Theiler et al. |
| 2011/0259920 | A1 | 10/2011 | Rennie et al. |
| 2012/0048420 | A1 | 3/2012 | Martin |
| 2014/0024711 | A1 | 1/2014 | Hedbom et al. |
| 2014/0034679 | A1 | 2/2014 | Fitzpatrick et al. |
| 2014/0079648 | A1 | 3/2014 | Cohen |
| 2014/0216603 | A1 | 8/2014 | Brown |
| 2014/0263421 | A1 | 9/2014 | Urban et al. |
| 2014/0327545 | A1 | 11/2014 | Bolling et al. |
| 2014/0366264 | A1 | 12/2014 | Ciavarella et al. |
| 2015/0080478 | A1 | 3/2015 | Cohen et al. |
| 2015/0165392 | A1 | 6/2015 | Fawcett et al. |
| 2015/0223646 | A1 | 8/2015 | Wegelin et al. |
| 2015/0251892 | A1 | 9/2015 | Ciavarella et al. |
| 2015/0320265 | A1 | 11/2015 | Bullock et al. |
| 2016/0167940 | A1 | 6/2016 | O'Rourke |
| 2016/0296080 | A1 | 10/2016 | Jeunen |
| 2017/0035257 | A1 | 2/2017 | Moore et al. |
| 2021/0295214 | A1 | 9/2021 | Katayama |

OTHER PUBLICATIONS

International Search Report and Written Opinion from PCT/US2018/022334 dated Aug. 3, 2018 (20 pages).

* cited by examiner

REFILLING SYSTEMS, REFILLABLE CONTAINERS AND METHOD FOR REFILLING CONTAINERS

RELATED APPLICATIONS

The present application is a continuation of U.S. application Ser. No. 17/568,917, filed on Jan. 5, 2022, which is a continuation of U.S. application Ser. No. 17/184,682, filed on Feb. 25, 2021, now U.S. Pat. No. 11,220,420, which is a divisional of U.S. application Ser. No. 15/920,826, filed on Mar. 14, 2018, now U.S. Pat. No. 10,961,107, which claims priority to and any benefit of U.S. Provisional Application No. 62/471,011, filed on Mar. 14, 2017, U.S. Provisional Application No. 62/511,687, filed on May 26, 2017, and U.S. Provisional Application No. 62/531,926, filed on Jul. 13, 2017, all of which are incorporated herein by reference in their entirety.

TECHNICAL FIELD

The present invention relates generally to methods and systems for filling dispenser systems and more particularly to hygienic dispenser refilling methods and systems.

BACKGROUND OF THE INVENTION

Refillable dispensers are known and are commonly used. In such systems, a user typically opens up the reservoir, by, for example, removing the pumping mechanism and spout to expose an opening to the reservoir, opening up a bulk refill container and pouring fluid from the bulk refill container into the opening to fill the storage reservoir. These systems are often messy and in addition, provide pathways for germs, bacteria and mold to enter the dispenser systems. Accordingly, the refillable dispensers may inadvertently be dispense germs, bacteria and/or mold along with the soap or other fluid being dispensed.

SUMMARY

Exemplary soap refilling systems and methods are disclosed herein. An exemplary soap refill system includes a bulk refill container containing a fluid soap. A hose in fluid communication with the bulk refill container and a quick connect fitting on an end of the hose.

An exemplary method of refilling a refillable container includes providing a bulk refill container. Connecting a quick connecter to a refill port of a refillable container. Refilling the refillable container and disconnecting the quick connector from the refill port.

Another exemplary soap refill system includes a housing, a bulk refill container containing a fluid soap releasably secured to the housing and a pump located in the housing. The bulk refill container in fluid communication with the pump. A power source is located within the housing for proving power to the pump. A hose is in fluid communication with the pump. A quick connect fitting is on an end of the hose.

Another exemplary soap refill system includes a housing, a concentrate refill container containing a concentrate fluid soap releasably secured to the housing. A water inlet and a static mixer is provided. The concentrate refill container is in fluid communication with a pump. A hose in fluid communication with the static mixer and includes a quick connector located at the other end for connecting to a refill port.

An exemplary refill unit includes a container, a liquid outlet and a refill connector. The refill connector has a liquid inlet and an air outlet. The refill unit includes a vent for allowing air to enter the refill unit when fluid is removed from the container and a filter in fluid communication with the vent for venting air flowing in through the vent.

Another exemplary refill refilling system includes a housing, a pump located within the housing, and a bulk storage tank connector. The bulk storage tank connector having a liquid outlet and an air inlet. A liquid inlet conduit is in fluid communication with the pump the liquid outlet. A refill connector is included. The refill connector has a liquid inlet and an air outlet. The refill connector air outlet and the bulk storage tank connector air inlet are in fluid communication with one another. The refill liquid inlet is in fluid communication with the pump.

BRIEF DESCRIPTION OF THE DRAWINGS

These and other features and advantages of the present invention will become better understood with regard to the following description and accompanying drawings in which.

DETAILED DESCRIPTION

Exemplary embodiments for refilling a bulk system are shown and described in applicants co-pending application US Pat. Pub. No. 2015/0251892, titled Fluid Dispenser and Fluid Refill System for Fluid Dispenser, which was filed on Mar. 4, 2015 and, which is incorporated herein its entirety. Some of these systems use gravity to transfer fluid from a sealed bulk container to a dispenser reservoir and an air pathway to transfer air from the reservoir to the refill container. The speed at which these systems are refilled may be slow, may vary depending on temperatures and viscosities, may vary based on the level of fluid in the bulk refill system, etc. Some exemplary embodiments utilize a collapsible or compressible bulk refill container and a collapsible/expandable reservoir. In such systems, the collapsible/expandable reservoir is typically collapsed after its contents have been dispensed. When the bulk refill unit is connected to the reservoir, the bulk refill container is collapsed under pressure and the contents are forced into the reservoir, thereby expanding the collapsed reservoir. Additional exemplary embodiments for filling containers from a bulk system are shown and described in applicants co-pending application US Pat. Pub. No. 2014/0230960, titled Personal Dispenser Refilling Station, which was filed on Feb. 20, 2013 and, which is incorporated herewith in its entirety.

In some embodiments, all air that is in contact with the interior of the containers has been filtered through a filter to remove any bacteria from the air. In some embodiments, the filter used to filter the air has a porosity of about 0.45 μm.

In addition, in some embodiments, the soap formulation that is used is a soap formulation that resists bacterial growth. Exemplary formulations may be found in Applicants co-pending U.S. Provisional Patent Application titled "Alcohol Containing Topical Cleansing Composition" Ser. No. 62/492,622, which was filed on May 1, 2017 and which is incorporated by reference herein in its entirety. In exemplary embodiments, the formulation contained in the bulk refill containers and dispensers is a soap containing alcohol. In some embodiments, the volume of alcohol is less than about 40%. In some embodiments, the volume of alcohol is less than about 35%. In some embodiments, the volume of alcohol is less than about 30%. In some embodiments, the volume of alcohol is less than about 25%. In some embodiments, the volume of alcohol is less than about 20%. The alcohol prevents, or helps prevent bacterial from growing.

Figure 1:
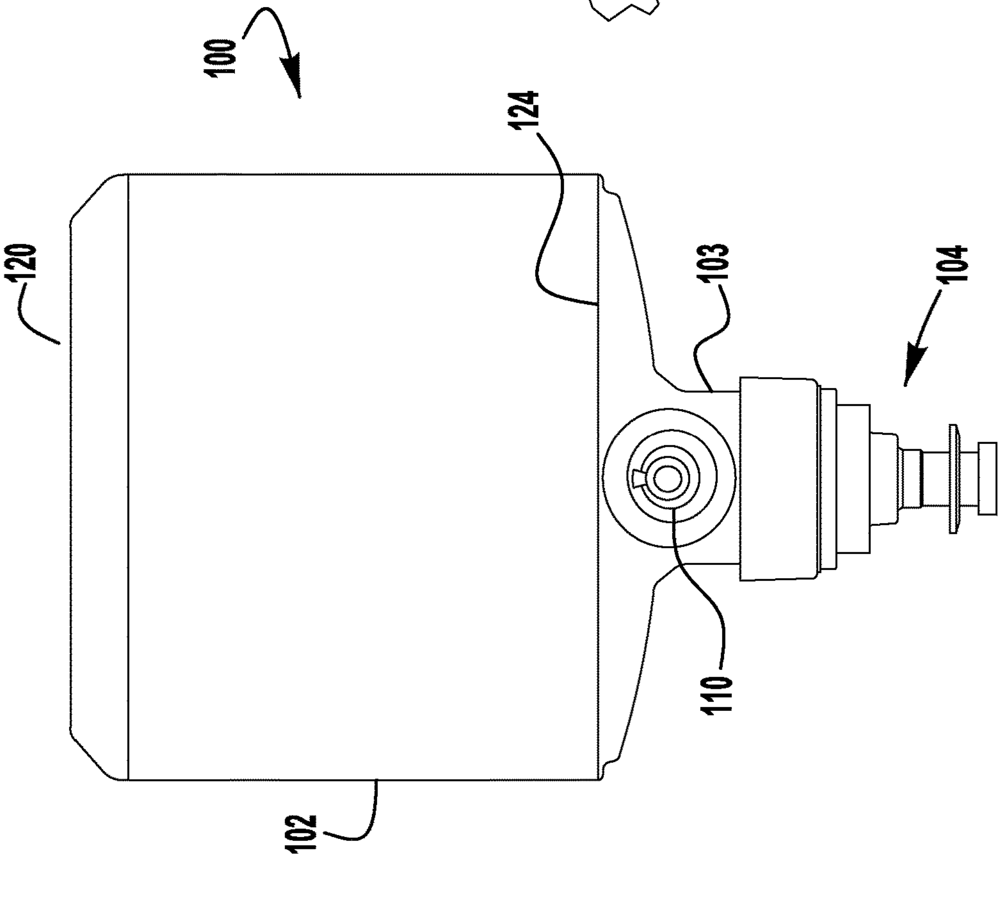
FIG. 1 is front view of an exemplary refillable system.

FIG. 1 is front view of an exemplary refillable system 100. Refillable system 100 includes a container 102 that has a neck 103. A refill port 110 is located in the neck 103 and a pump 104 is connected to the neck 103. This exemplary embodiment includes a cap 102 located at the top of container 102. As described below, in some embodiments one or more vents (not shown) may be located through container 102 under cap 120. In some embodiments, refill port 110 includes a vent (not shown). Additional exemplary containers that may be used with the inventive concepts disclosed herein are shown and described in co-pending US Pat. Pub. No. 2015/0239644, titled Vented Non-Collapsing Containers Dispensers and Refill Units Having Vented Non-Collapsing Containers filed on Feb. 23, 2015, which is incorporated herein by reference in its entirety.

Figure 2:
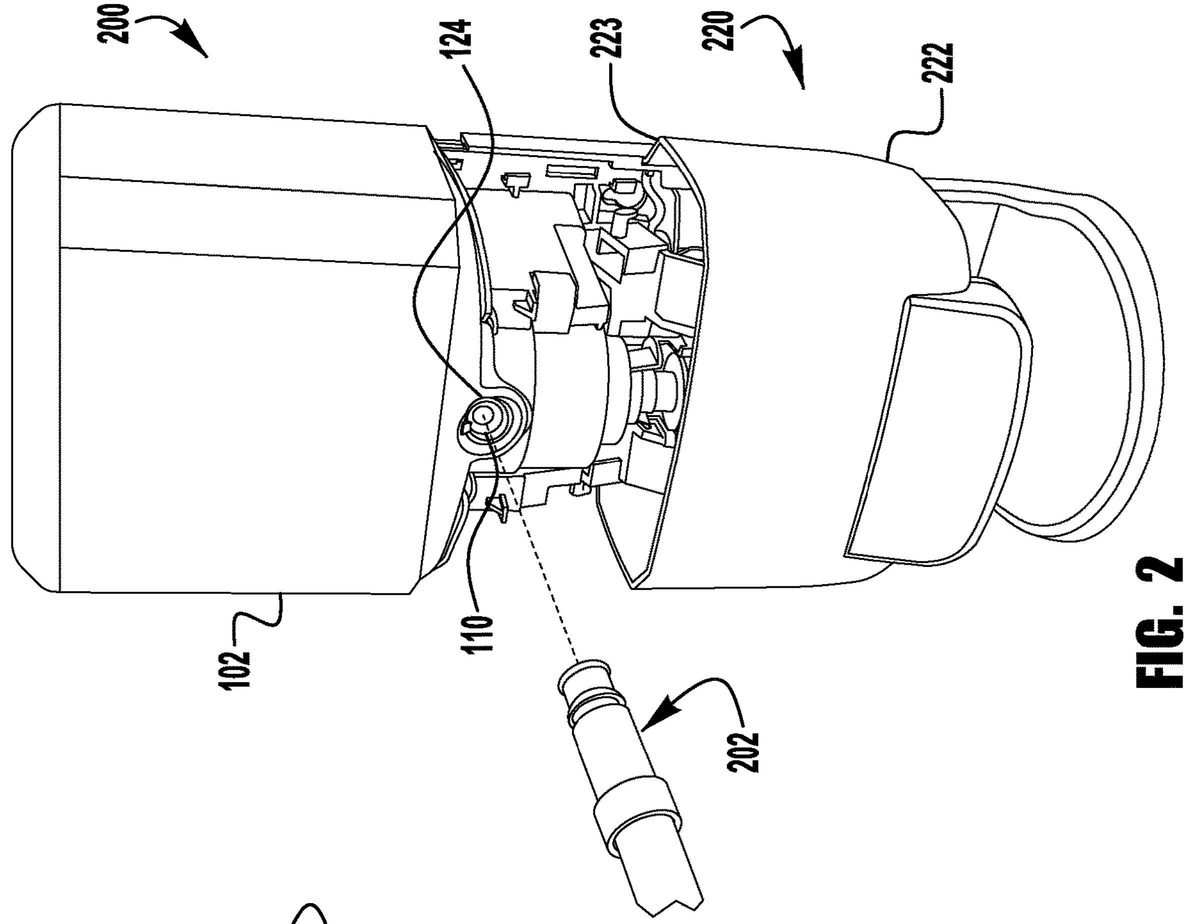
FIG. 2 is a front view of an exemplary refillable system in a dispenser.

FIG. 2 is a front view of an exemplary system 200 having a refillable container 102 installed in a dispenser 220. Exemplary dispenser 220 is shown with its housing 222 slid down to reveal refill port 110. During normal use, dispenser housing 220 is slid upward so that the top 223 of housing 222 is proximate level 124 of container 102 concealing refill port 110. An exemplary dispenser is shown and described in U.S. Non-Provisional patent application Ser. No. 15/281,832 titled Slide Open Refillable Dispenser filed on Sep. 30, 2016, which is incorporated herein by reference in its entirety. Other types of dispensers may be used provided refill port 110 is accessible for refilling the container 102. A quick connector 202 connects to refill port 110 to refill container 102. Refill port 110 is located in neck 103, however, refill port may be located in other locations.

Figure 3:
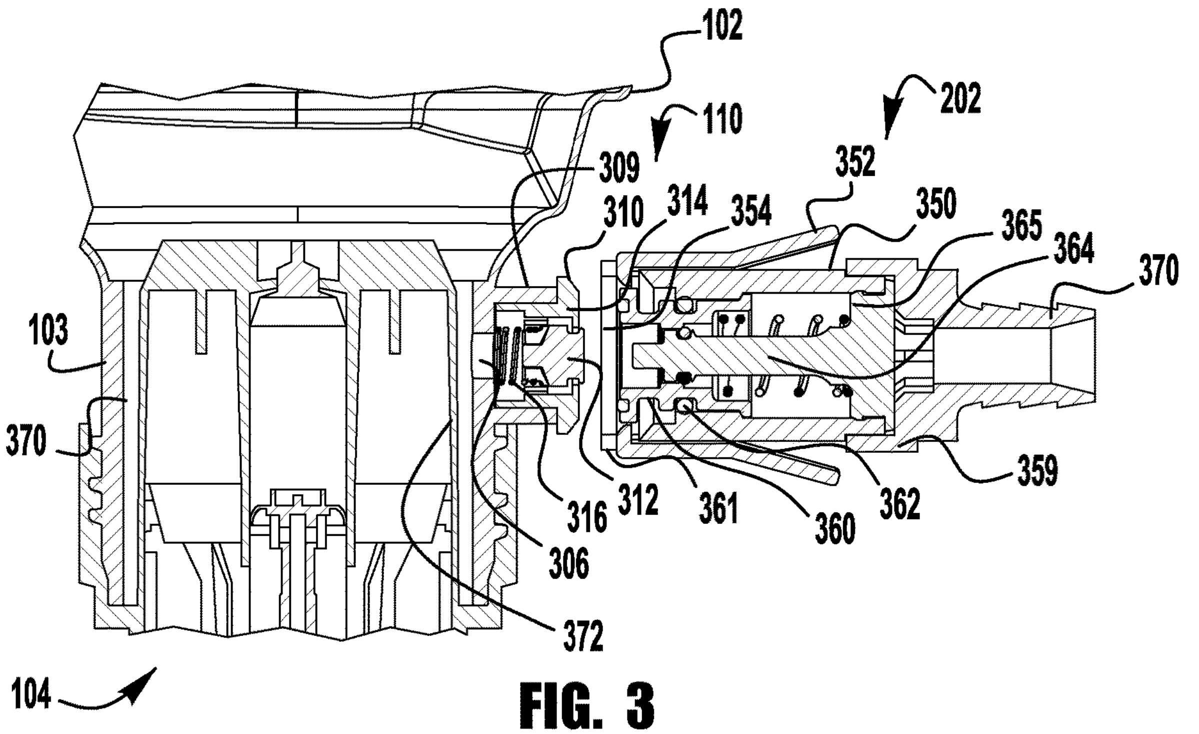
FIGS. 3-5 are partial cross-sectional views of an exemplary quick connector connecting to exemplary refillable ports of the refillable system of FIG. 1.

FIG. 3 is a cross-sectional view of an exemplary quick connector 202 for connecting to the exemplary refill port 110 of refillable container 102 and partial cross-sectional view of refillable container 102 and pump 103. Refill port 110 has an annular side wall 309 extending outward from neck 103. An annular catch projection 310 extends around annular side wall 309. An aperture 306 places the interior of container 102 in fluid communication with a cavity 311 formed by the interior of the annular sidewall 309. A plunger 312 is retained within cavity 311 with retaining member 311 and is biased outward by biasing member 316 to seal the outlet of the refill port 110.

Quick connector 202 includes a housing 350. Secured to housing 350 is release member 352 that includes latch projections 354 that engage annular catch projection 310 when quick connector 202 is connected to refill port 110. Attached to housing 330 is hose connector 370 for connecting quick connector 202 to a hose (not shown). Located within housing 330 is connector plunger 359. Connector plunger 359 is biased toward the opening of housing 330 by a biasing member 365. Connector biasing member 365 may be any member that biases the plunger 359 towards the opening, such as, for example, a spring. Connector plunger 359 has a first sealing member 360. First sealing member 360 seals against a surface 361 of the refill port 110 when the quick connector 202 contacts the surface 361 of refill port 110. First sealing member 360 may be, for example, an o-ring. Connector plunger 359 has a second sealing member 363. Second sealing member 363 seals against a surface of the housing 350 to prevent fluid from leaking out of quick connector 202. Second sealing member 363 may be, for example, an o-ring.

In addition, located within housing 350 is projection 364. During operation, projection 364 engages refill port plunger 312 and moves refill port plunger 312 inward to allow fluid flow when the quick connector 202 is fully engaged with refill port 110. The length of projection 364 is designed so that sealing member 360 contacts and seals against surface 361 prior to projection 364 moving refill port plunger 312 away from its closed/sealed position. Projection 364 includes a third sealing member 362. Third sealing member 362 forms a seal between projection 364 and connector plunger 359 when in the closed position. Third sealing member 362 may be, for example, an o-ring.

Figure 4:
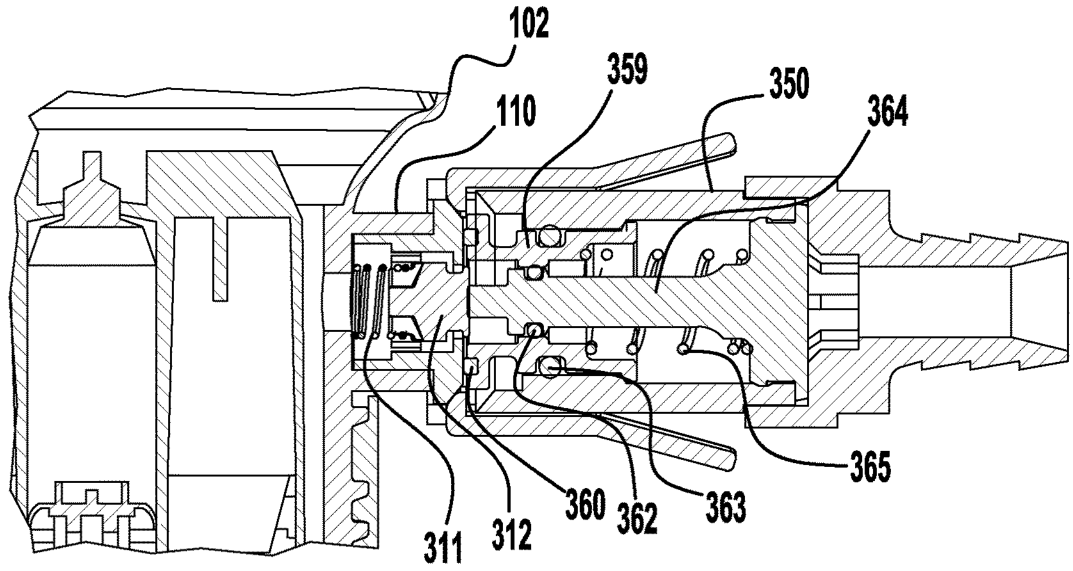
Figure 5:
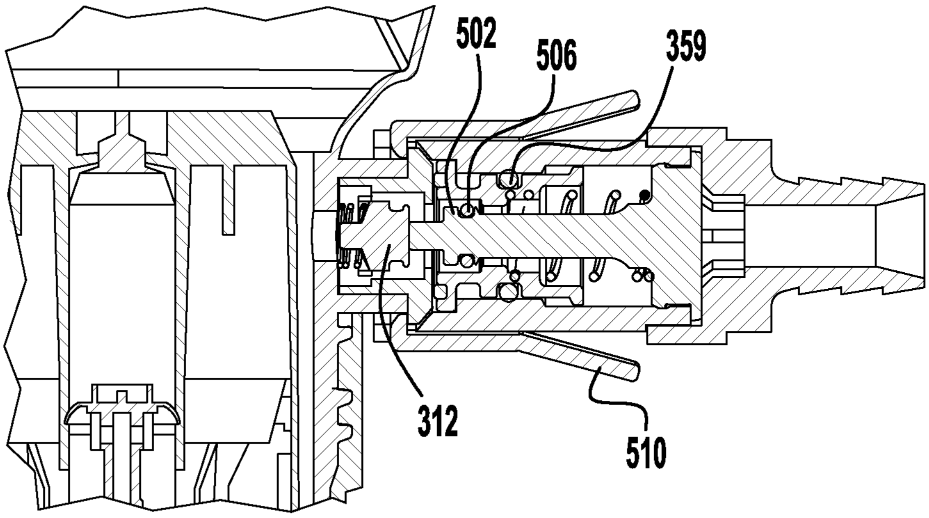

FIGS. 3-5 illustrate a sequence of operation that occurs while connecting the quick connector 202 to refill port 110. As can be seen in FIG. 3, refill port plunger 312 is biased in a sealing position sealing off the opening in refill port 110. Connector plunger 359 is biased toward the opening in housing 350. As can be seen in FIG. 4, first sealing member 360 seals against surface 361 prior to movement of either refill port plunger 312 or connector plunger 359. As the quick connector 202 is pushed further in towards refill port 110, latch projection 354 moves outward and due to its resilient nature slides over annular catch projection 310 to connect quick connector 202 to refill port 110. At the same time, projection 259 causes refill port plunger 312 to move backward opening fluid pathway 502 and connector plunger 359 moves inward opening fluid path 506. Accordingly, fluid may flow from a hose (not shown) through hose connector 370, housing 350 through flow paths 506, 502 into refill port 10, through aperture 316 and passage 372 and into container 102.

Quick connector 202 is removed from refill port 110 by compressing the ends 510 of release member 352 which releases latch member 354 from annular catch projection 310. As quick connector 202 is pulled away from refill port 110, refill port plunger 312 moves to its closed position closing fluid pathway 502 and connector plunger 359 moves outward closing fluid pathway 506 prior to first sealing member 360 losing contact, or its seal, against surface 361. Another exemplary connector that may be used is shown and described in U.S. Pat. Pub. No. 2015/0251892, which is incorporated herein by reference in its entirety.

Figure 6:
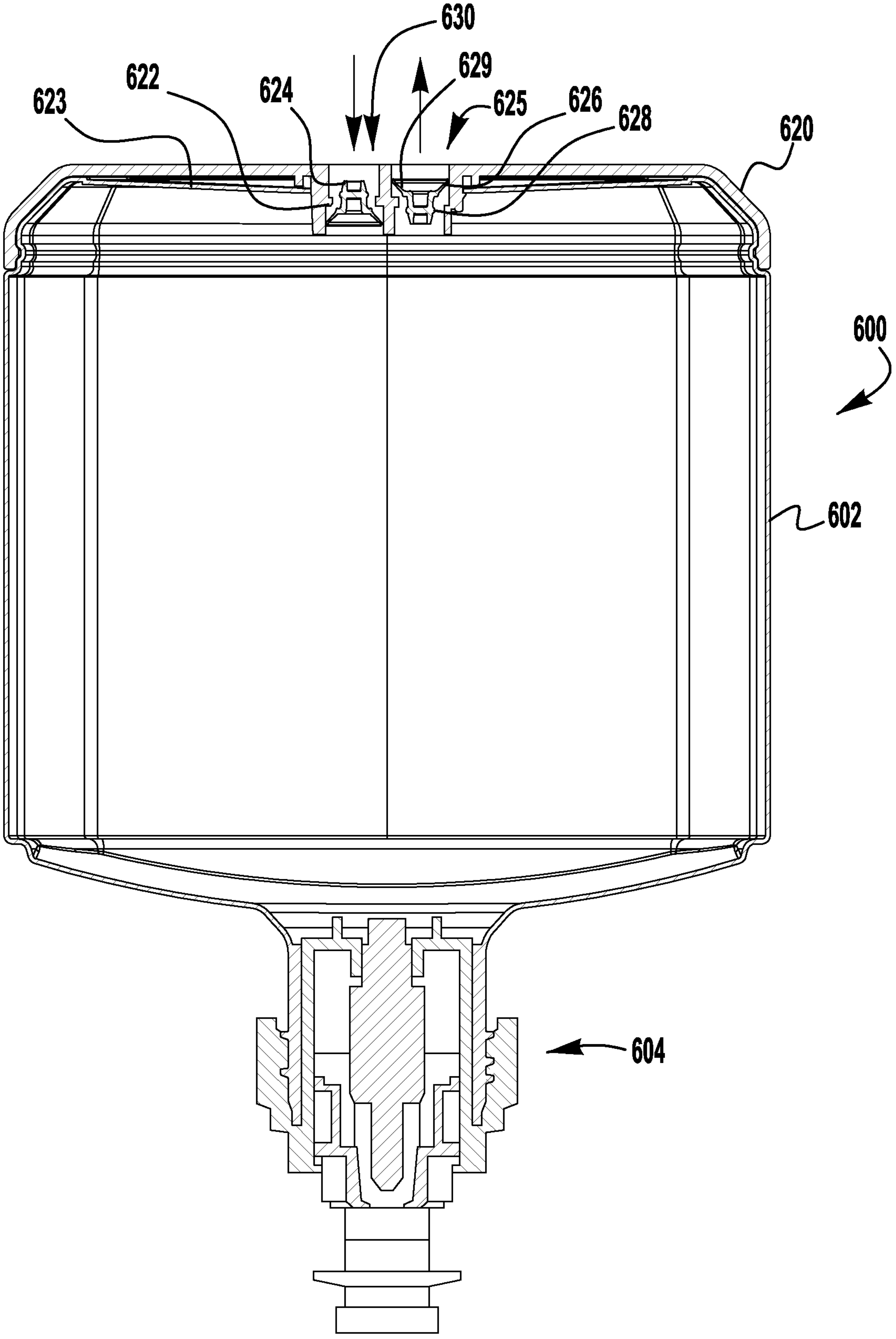
FIG. 6 is a cross-sectional view of another exemplary refillable system.

FIG. 6 is a cross-sectional view of another exemplary refillable system 600. Refillable system 600 includes a container 602 having a pump 604 attached thereto. In exemplary embodiments, a refill port (not shown) is included for refilling container 602. Secured to the top of container 602 is a cap 620. Cap 620 includes a first annular projection 622 and a second annular projection 626. Located within first annular projection 622 is a one-way air inlet valve 624. In exemplary embodiments, one-way air inlet valve 624 may be, for example, a wiper valve, a slit valve, a duck bill valve, a mushroom valve, a flapper valve, or the like. Located within second annular projection 626 is a one-way air outlet valve 629. In exemplary embodiments, one-way air inlet valve 629 may be, for example, a wiper valve, a slit valve, a duck bill valve, a mushroom valve, a flapper valve, or the like. One or more apertures 623, 626 are located in container 602 beneath cap 620. In this exemplary embodiment, when the internal pressure of container 602 increases, such as, for example, when container 602 is filled, air may pass out of the container through the one or more apertures and through one-way air outlet valve 629. During operation when fluid if pumped out of container 602, air may flow into container 602 through one-way air inlet valve 624 and the one or more apertures into container 602.

Figure 7:
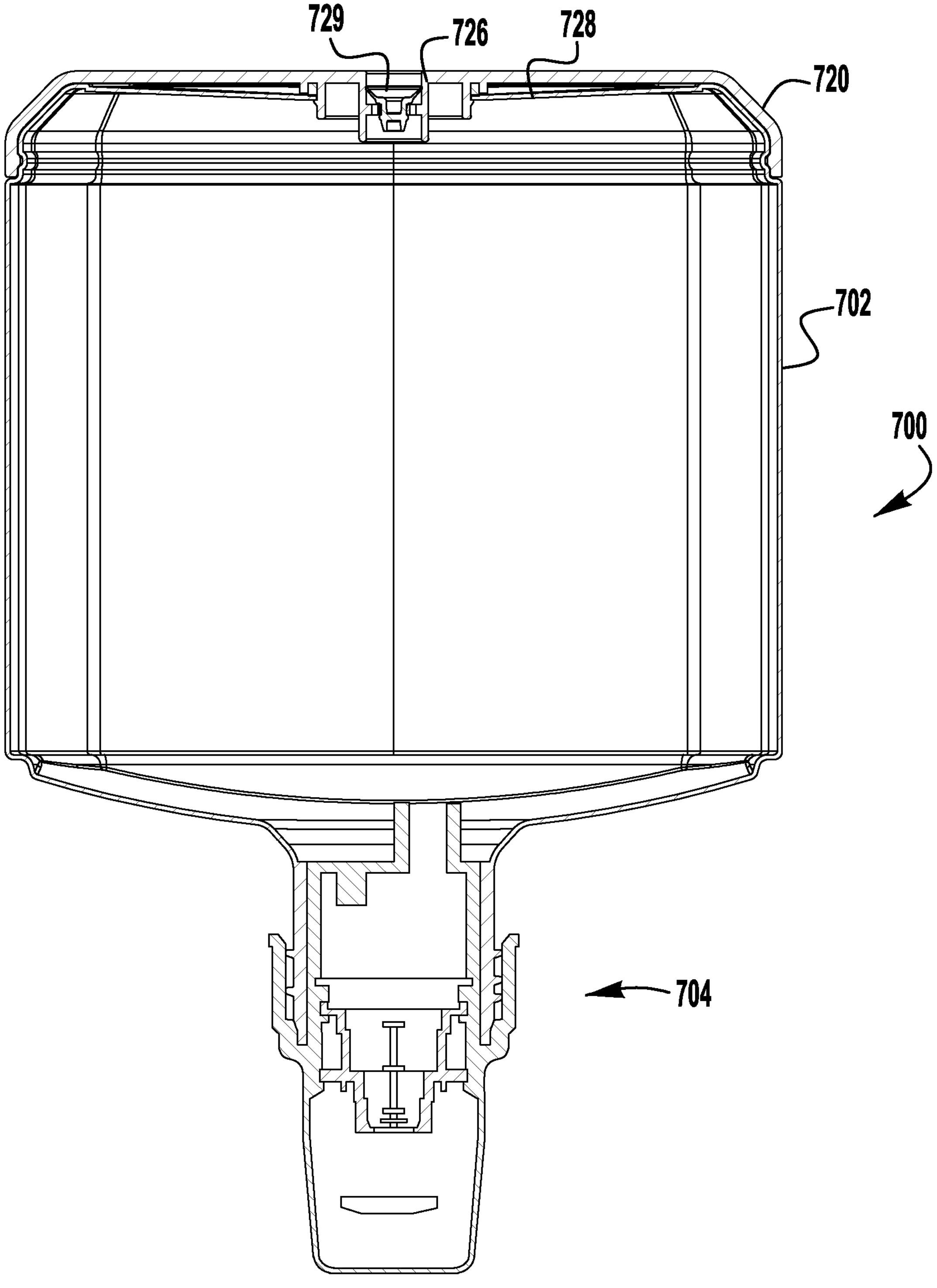
FIG. 7 is a cross-sectional view of another exemplary refillable system.
Figure 8:
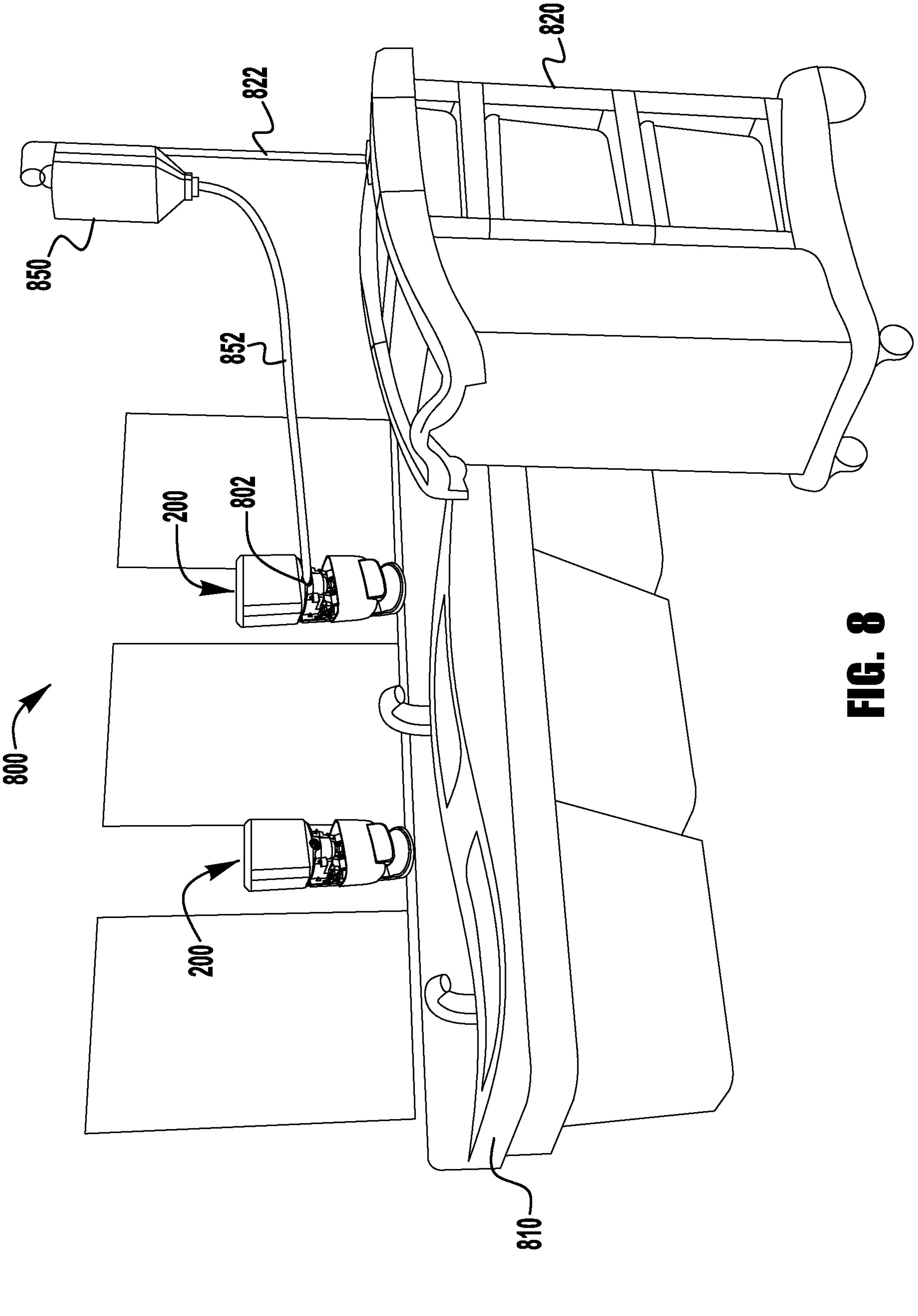
FIGS. 8-12B are exemplary embodiments of systems for filing refillable systems.

FIG. 7 is a cross-sectional view of another exemplary refillable system 700. Refillable system 700 includes a container 702 having a pump 704 attached thereto. In exemplary embodiments, a refill port (not shown) is included for refilling container 702. Secured to the top of container 702 is a cap 720. Cap 720 includes an annular projection 726. Located within annular projection 726 is a one-way air outlet valve 729. In exemplary embodiments, one-way air inlet valve 729 may be, for example, a wiper valve, a slit valve, a duck bill valve, a mushroom valve, a flapper valve, or the like. One or more apertures 728 are located in container 702 beneath cap 720. In this exemplary embodiment, when the internal pressure of container 702 increases, such as, for example, when container 702 is filled, air may pass out of the container through the one or more apertures and through one-way air outlet valve 729. During operation when fluid if pumped out of container 702, air may flow into container 702 through a one-way air inlet valve (not shown), such as, for example, one that allows air to flow in proximate the pump 704.

FIG. 80 is an exemplary embodiment of a system 800 for filing refillable systems installed in dispensers 200. In this exemplary embodiment of a cart 820 includes one or more hangers 822 that hold a refilling container 850. Connected to refilling container 850 is a hose 852 with quick connector 802. Dispenser 200 is opened to expose a refill port (not shown). Quick connector 802 is connected to the refill port and gravity is used to move fluid from refill container 850 to the container of dispenser 200.

Figure 9:
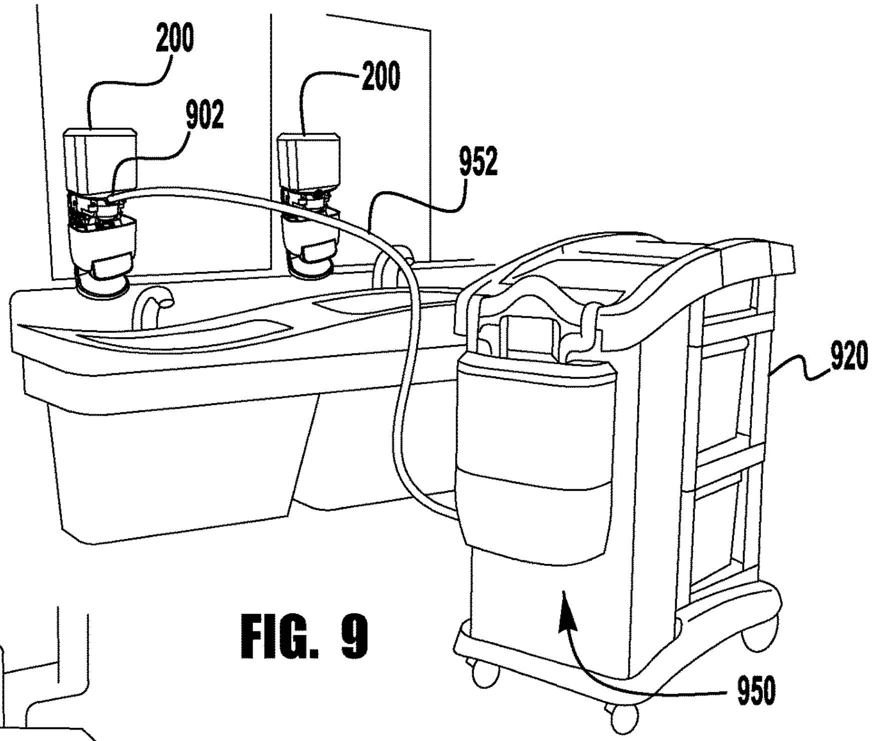
Figure 9A:
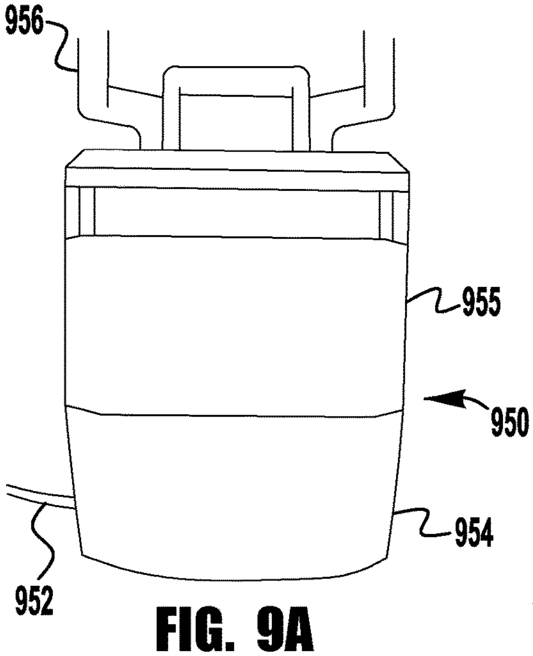

FIG. 9 is an exemplary embodiment of a system 900 for filing refillable systems installed in dispensers 200. In this exemplary embodiment of a cart 920 includes a refilling container 950. Connected to refilling container 950 is a hose 952 with quick connector 902. Dispenser 200 is opened to expose a refill port (not shown). Quick connector 902 is connected to the refill port. A pump and motor (not shown) is located in the bottom portion 954 of refill container 950 and is in fluid communication with the contents of container 952. The pump (not shown) pumps fluid into dispenser 200. FIG. 9A is front view of the exemplary bulk refill container 950 and shows handle 956 which may be used to hang refill container 950 on cart 920.

Figure 9B:
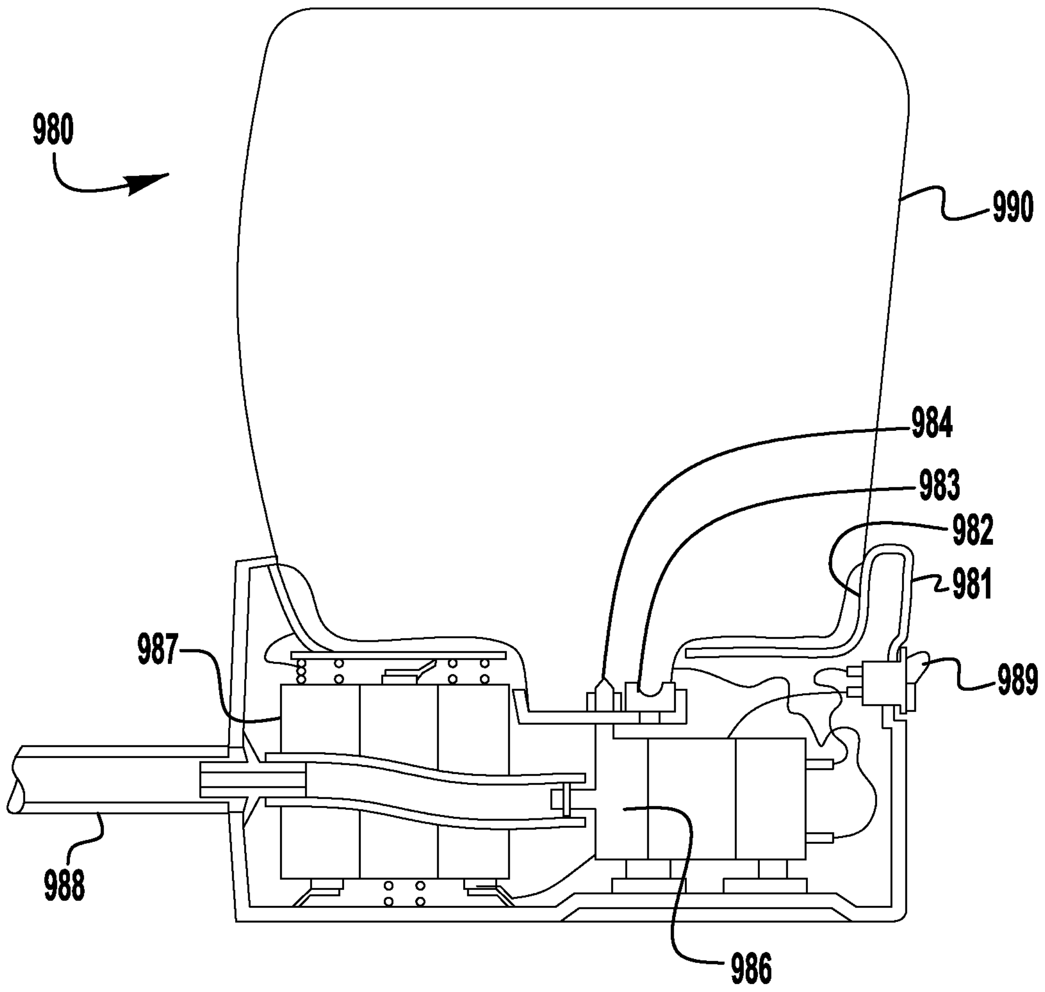

FIG. 9B illustrates an exemplary embodiment of a bulk refill device 980. Bulk refill device 980 includes a housing 981 having a replaceable bulk refill container 990 that is removable. Replaceable bulk refill container 990 is inserted in receptacle 982. Receptacle 982 includes a liquid inlet 984 for drawing fluid out of replaceable bulk refill container 990 and, in some embodiments, a vent 983 for allowing air to flow into replaceable bulk refill container 990 when liquid is pumped out of replaceable bulk refill container 990. Located within housing 981 is a pump 986 and batteries 987. In some embodiments, the pump is a sequentially operated diaphragm pump. The pump 986 is connected to hose 988 which has a quick connector (not shown) for connecting to a refillable container. Bulk refill device 980 includes an on/off switch 989. In some embodiments, a sensor, such as, for example, a pressure switch, a level sensor, a weigh sensor, a wireless communication link (for receiving a signal from the dispenser that the refillable container is filled) and the like is included to shut of bulk refill device 980 when selected criteria is reached indicative of the refillable container being full.

Figure 10:
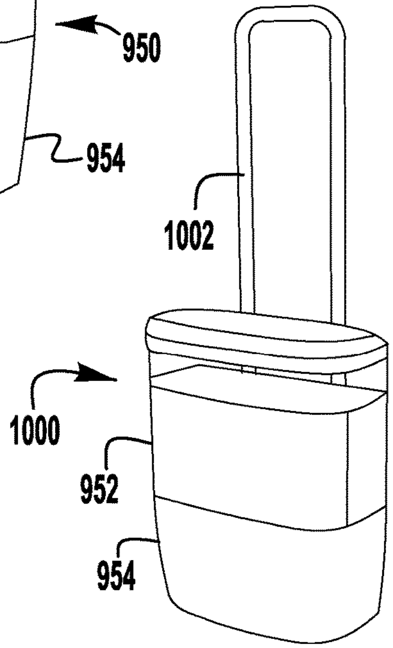
Figure 10A:
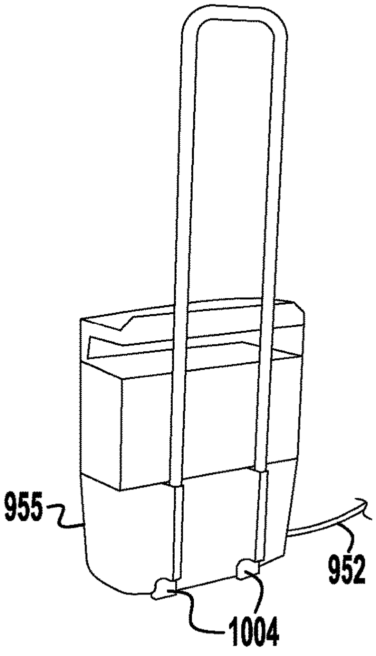

FIGS. 10 and 10B illustrate additional embodiments of refill container 950 that include a handle 1002 and two or more wheels 1004. In this manner, refill container 954 may be moved from one location to another similarly to who luggage is moved from one location to another.

Figure 11A:
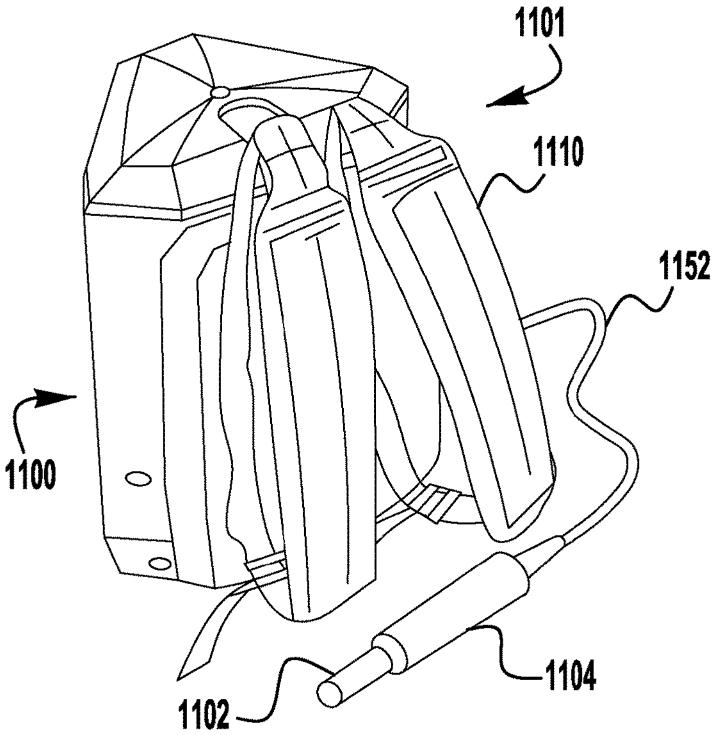
Figure 11B:
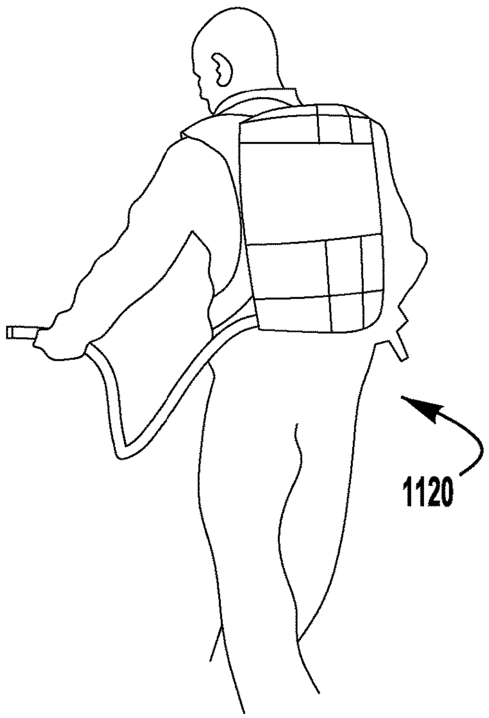
Figure 11C:
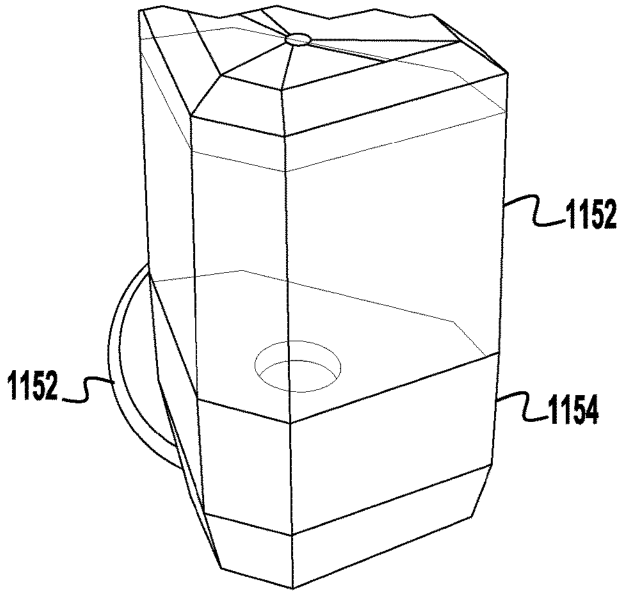

FIG. 11A-11C illustrate another exemplary embodiment of a system 1100 for filing refillable systems installed in dispensers. System 1100 has a backpack 1101 having shoulder straps 1110, a hose 1152, a handle 1104 and quick connector 1102. The backpack 1101 is worn by a user 1120 and includes a container 1152 and bottom portion 1154 with a pump (not shown) for pumping fluid out of container 1152 into a refillable container (not shown).

Figure 12:
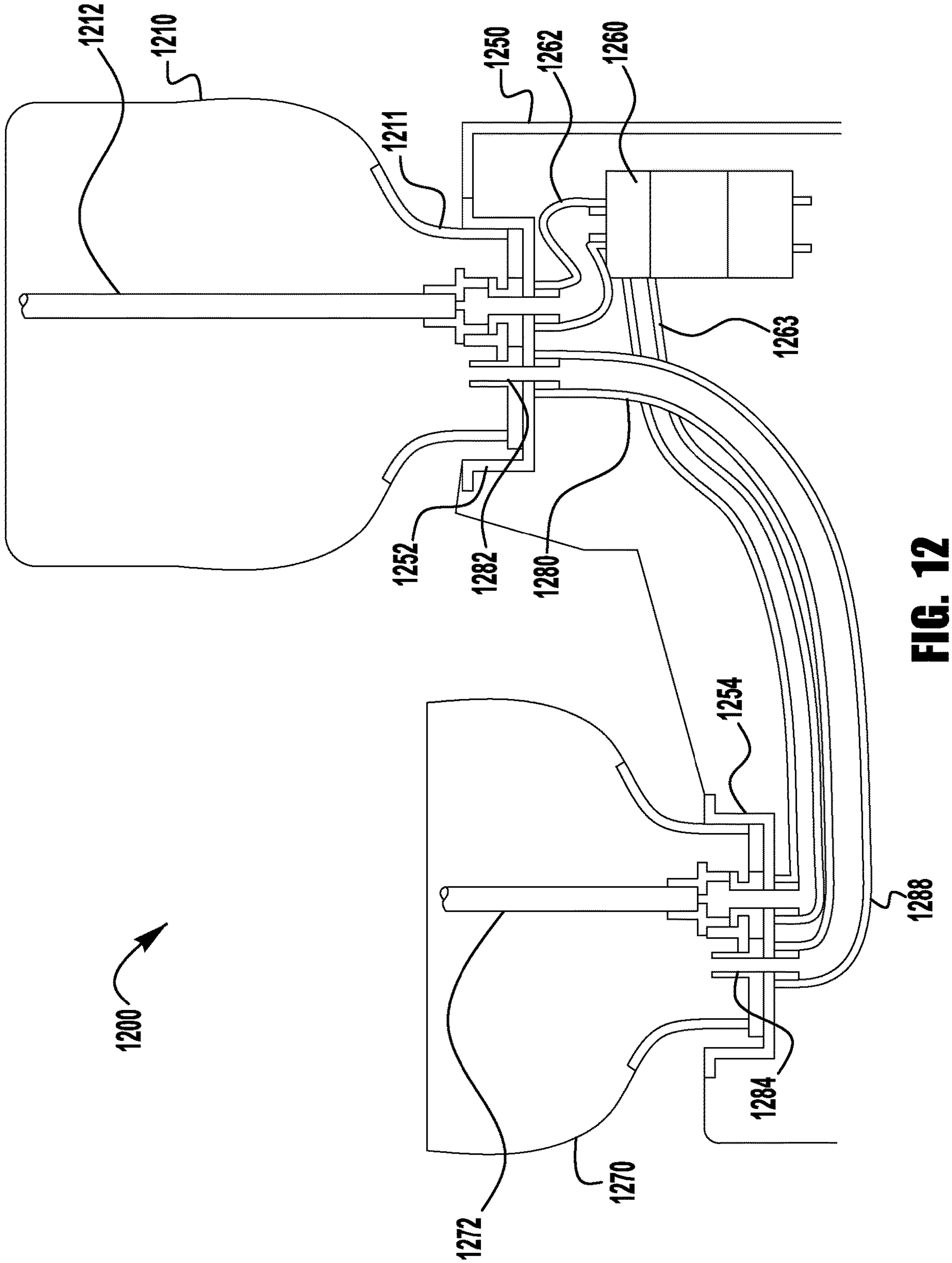

FIG. 12 illustrates another exemplary embodiment of a refilling system 1200. Refilling system 1200 includes a base 1250. Base 1250 includes a first receptacle 1252 for receiving a bulk dispensing container 1210, and a second receptacle 1254 for receiving a refillable container 1270. Located within first receptacle 1252 is a liquid outlet port 1282 and air inlet conduit 1212. When bulk dispensing container 1210 is installed in first receptacle 1252 liquid outlet port 1282 is in fluid communication with the liquid in container 1210 and conduit 1212 extends up into container 1210. Located within second receptacle 1254 is a liquid inlet port 1284 and air outlet conduit 1272. When refillable container 1270 is installed in second receptacle 1254 liquid inlet port 1284 is in fluid communication with the interior of container 1270 and conduit 1272 extends up into container 1270. An air pump 1260 is in fluid communication with conduit 1212 via hose 1262 and is in fluid communication with conduit 1272 via hose 1263. Liquid outlet port 1282 is in fluid communication with liquid inlet port 1284 via hose 1288. During refilling, air pump 1260 pumps air out of refillable container 1270 through conduit 1272 and into bulk refilling container 1210. The vacuum pressure created in refillable container 1270 and positive pressure in bulk refilling container 1210 causes fluid to flow from bulk refilling container 1210 into refillable container 1270.

Figure 12A:
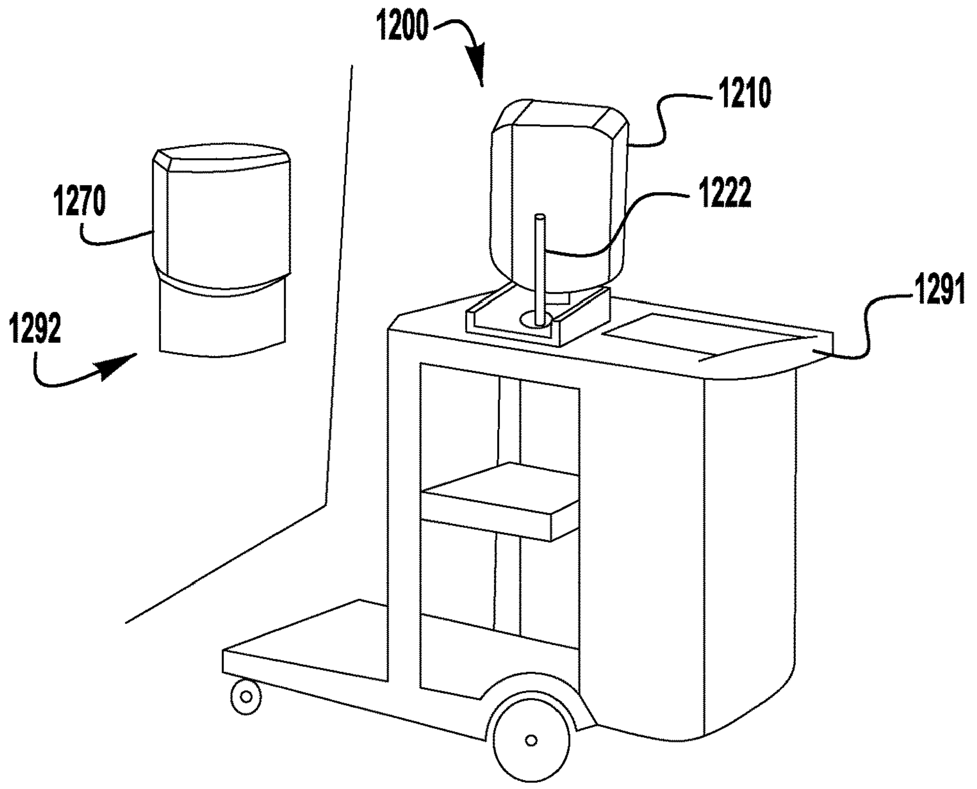
Figure 12B:
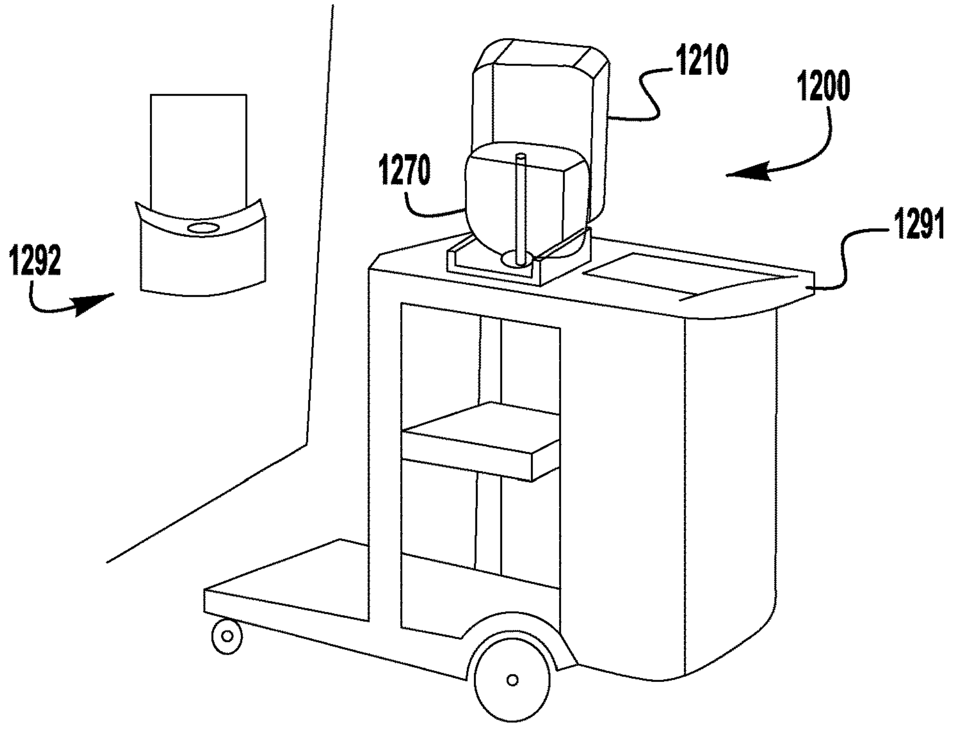

FIGS. 12A and 12B illustrate an exemplary system using refilling 1200. Refilling system 1200 is mounted on a cart 1291. Cart 1291 is rolled around to one or more dispensers 1292, which in this case is a wall mounted dispenser. Wall mounted dispenser 1292 may be any dispenser, such as, for example, those described and incorporated herein. Wall mounted dispenser includes a removable refillable container 1270. Removable refillable container 1270 is removed from dispenser 1292 an lowered down over conduit 1272 and the system is turned on pumping air out of removable refillable container 1270 and into bulk refill container 1210 causing fluid to flow out of bulk refill container 1210 and into removable refillable container 1270. Removable refillable container 1270 is removed from the refilling station and inserted back into dispenser 1292.

Figure 13:
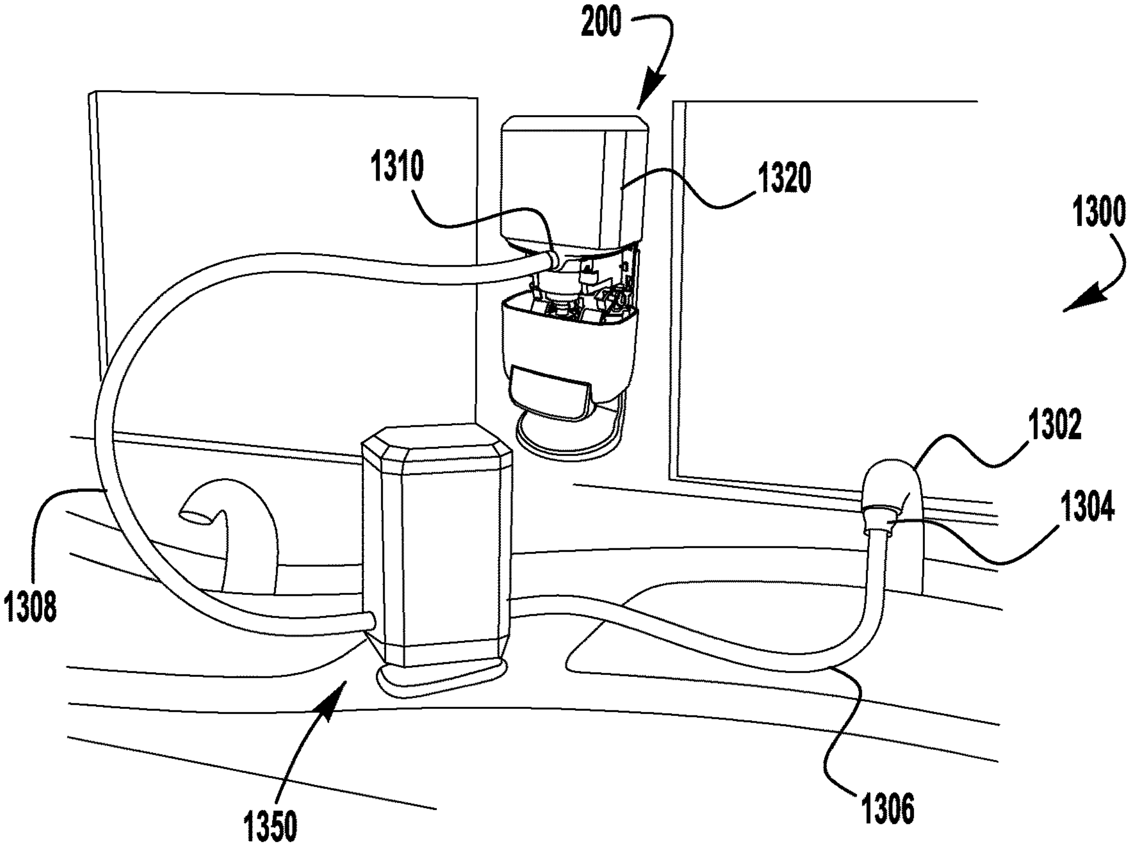
FIGS. 13-14 are exemplary embodiments of additional systems for filling refillable systems.
Figure 14:
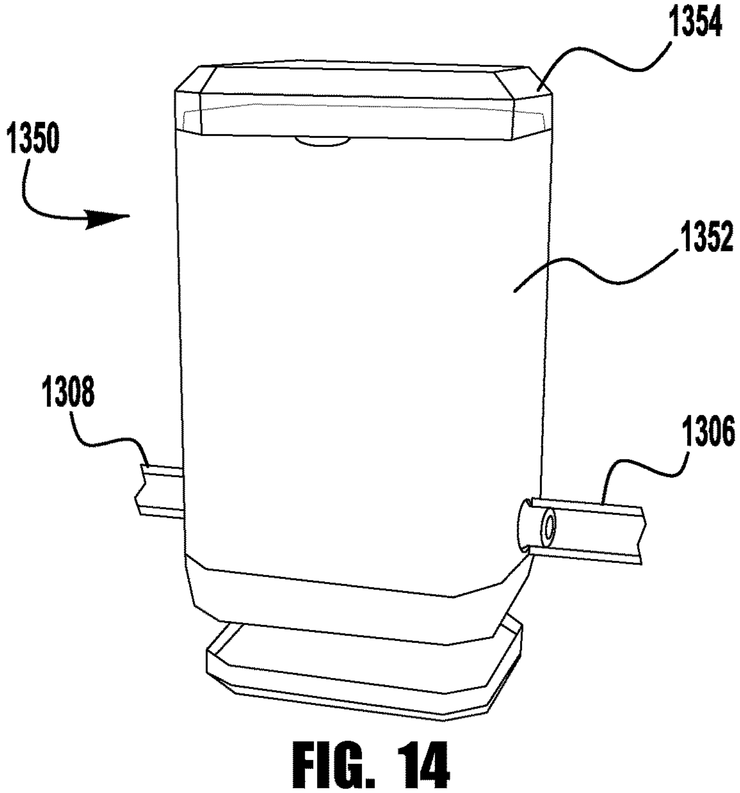

FIG. 13 illustrates an exemplary embodiment of an additional system 1300 for filing a refillable system installed in a dispenser 202. In this exemplary embodiment, a connector 1304 is connected to the outlet of a faucet 1302. A hose 1306 places the outlet of faucet 1302 in fluid communication with concentrate refilling device 1350 to provide a source of water to concentrate refilling device 1350. Hose 1308 is connected to the outlet of concentrate refilling device 1350 to place the outlet of concentrate refilling device 1350 to a refillable container 1320 via quick connect 1310 connected to a refill port (not shown). As seen in FIG. 14, concentrate refilling device 1350 includes a housing 1352 with a lid 1354 for adding concentrate to the concentrate refilling device 1350.

Figure 15:
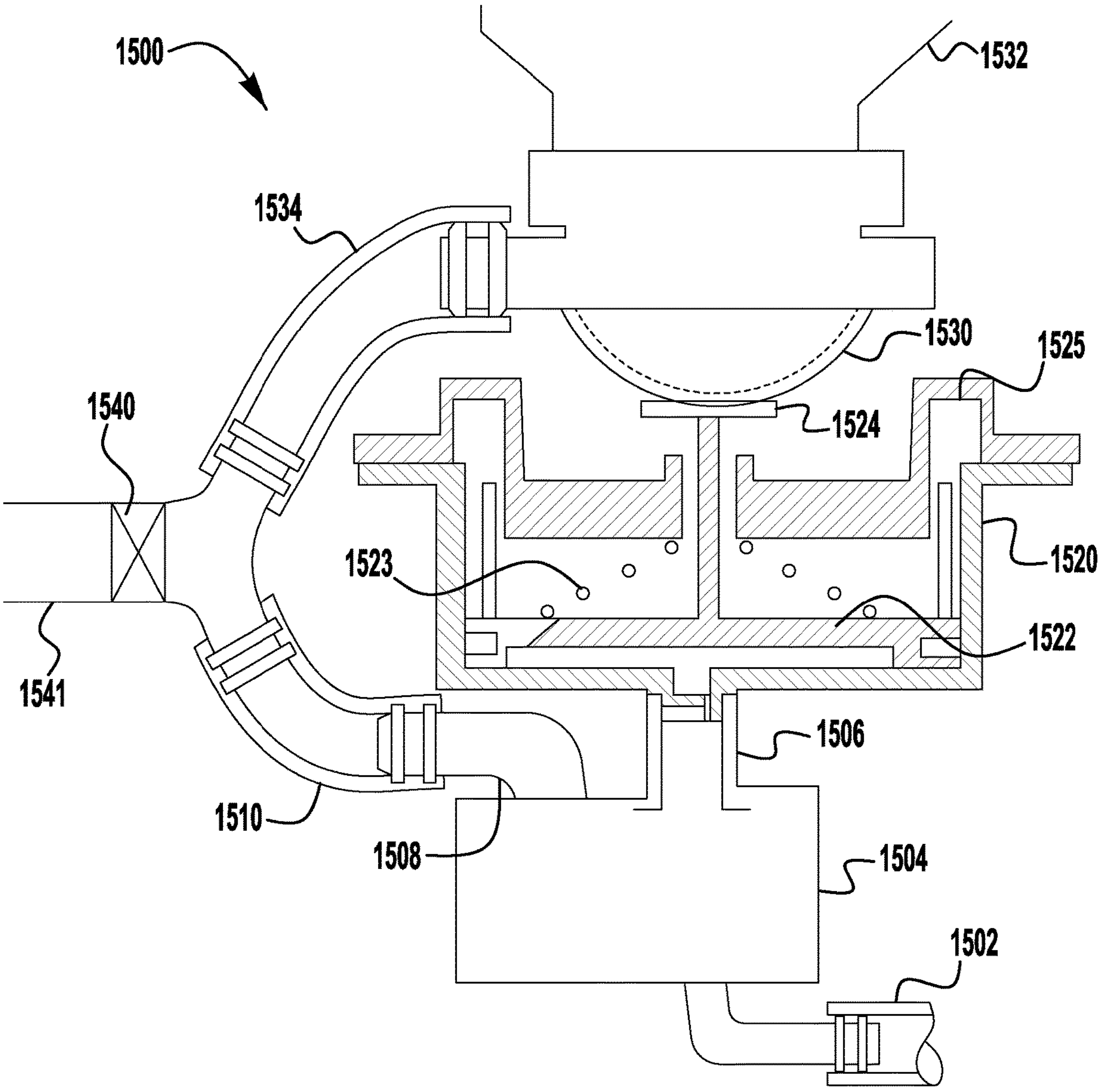
FIG. 15 is an exemplary embodiment of a concentrate mixing system.

FIG. 15 is an exemplary embodiment of a concentrate mixing system 1500. Concentrate mixing system 1500 includes a water inlet 502. Water inlet 1502 is connected to a water source, such as, for example, a faucet. Water inlet 1502 is in fluid communication with a three-way valve 1504. Three-way valve outlet 1506 is connected to water piston housing 1520. Three-way valve outlet 1506 is in fluid communication with water piston 1522, which is biased downward by biasing member 1523. A water piston limit switch is located in water piston housing 1522. Water piston 1522 includes a plunger 1524 that contacts a dome pump 1530 in fluid communication with a concentrate container 1532. Dome pump 1530 has an outlet in fluid communication with hose 1534 which is in fluid connection with static mixer 1540. Static mixer 1540 is in fluid communication with three-way valve outlet 1508 via hose 1510. Static mixer 1540 may include one or more mix media, such as for example, baffles, screens, projections, and the like. Static mixer 1540 is in fluid communication with hose 1541 which includes a quick connector (not shown) for connecting to a refill port of a refillable container (not shown). During operation, During operation, when three-way valve 1504 is at rest, water inlet 1502 is closed and water piston 1522 is biased to the illustrated position. When a refill is initiated, by for example, a button, a switch, connection to a dispenser, or the like, three-way valve 1504 is energized and shifts to open water outlet port 1506 and water outlet port 1508 is closed. Water flows into piston housing 1520 and moves water piston 1522 upward. The upward movement drives plunger 1525 into dome pump 1530, compressing dome pump 1530 and pumping a dose of concentrate into static mixer 1540. Water piston 1522 contacts limit switch 1525, which deenergizes there way valve 1504 and water is pushed out of water piston housing 1520 by biasing member 1523 down into three-way valve 1504 and out of water outlet 1508 into static mixer 1540 to mix with the concentrate. This is repeated until the refillable container (not shown) is filled. In exemplary embodiments, water is mixed in a ratio to concentrate soap of 2 to 1, of 3 to 1, of 4 to 1, of about 5 to 1, of about 6 to 1, of about 7 to 1, of about 8 to 1, of about 9 to 1, of about 10 to 1 or fractions thereof. In exemplary embodiments, the diluted soap flow rate ranges from about 0.5 liters per minute to about 2 liters per minute. U.S. Pat. Nos. 8,851,335 and 9,301,653 provide additional details of operating mechanisms that may be useful in exemplary embodiments of the present invention and these patents are incorporated herein by reference in their entirety.

Figure 16:
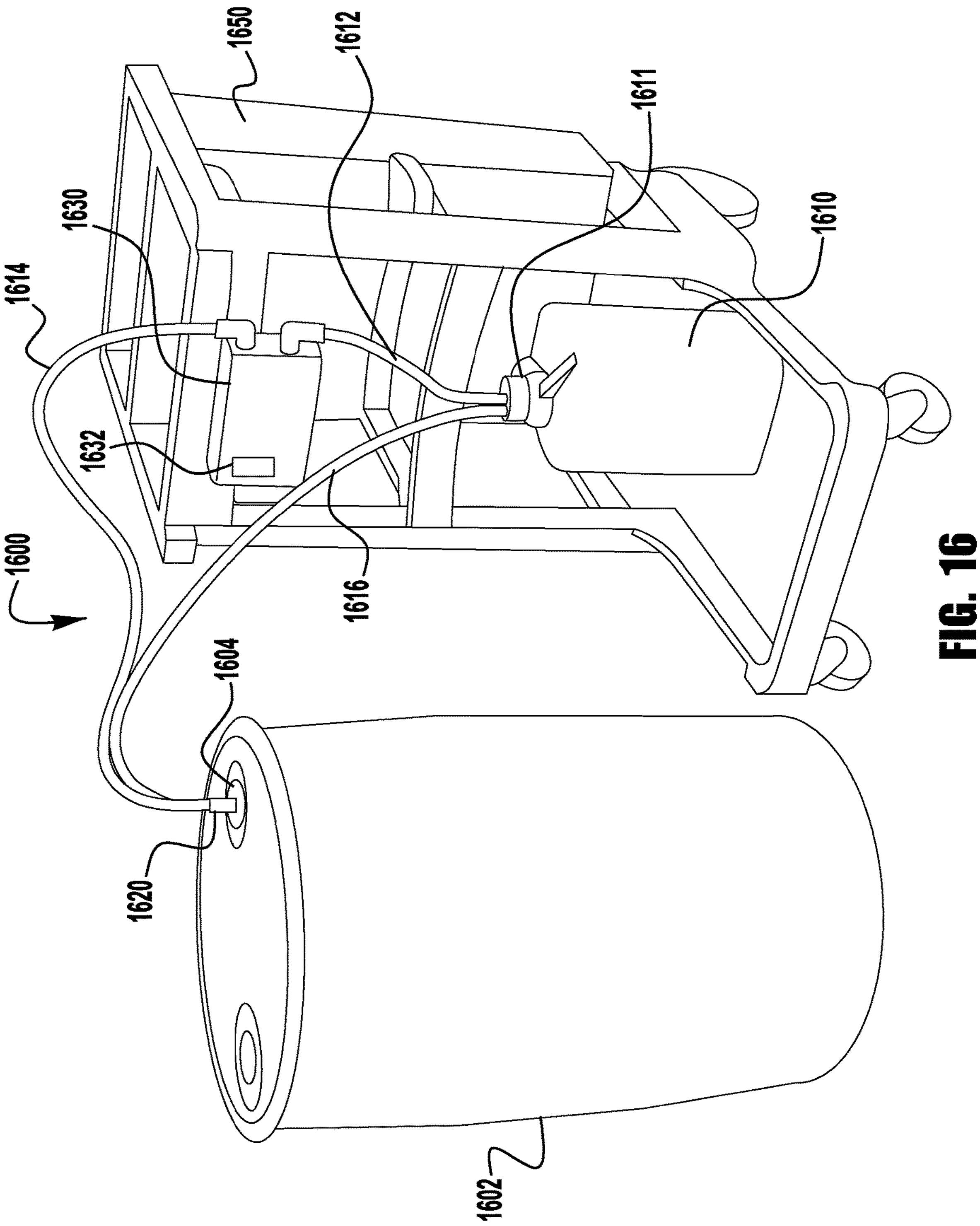
FIG. 16 illustrates an exemplary embodiment of a first portion of a closed loop system for filling a mobile bulk refill container.

FIG. 16 illustrates an exemplary embodiment of a first portion of a closed loop system 1600 for filling a mobile bulk refill container 1610. The closed systems described herein prevent contamination of the liquid that may occur in systems using bulk soap. When transferring the bulk soap to smaller containers and or dispensers, the air in one container is transferred to the container. In some embodiments, all air that is in contact with the interior of the containers has been filtered through a filter to remove any bacteria from the air. In some embodiments, the filter used to filter the air has a porosity of about 0.45 μm.

In this exemplary embodiment, mobile bulk refill container 1610 is located on a cart 1650. Mobile bulk refill container 1610 has a connector 1611 connected to a liquid conduit 1612 and an air conduit 1616. Air conduit 1616 is also connected to valved connector 1620. Liquid conduit 1612 connects to the liquid inlet of reversible pump 1630. Reversible pump 1630 includes three position switch 1632. Extending from the outlet of liquid pump 1630 to valved connector 1620 is liquid conduit 1614. Located within bulk refill container 1620 is a dip tube (not shown) that is in fluid connection with the liquid connection port of mating connector 1604 and extends down into stationary bulk refill container 1602.

Valved connector 1620 is a dual connector and includes valves (not shown). Valved connector 1620 is connected to mating connector 1604 on stationary bulk refill container 1602. When valved connector 1620 is connected to mating connector 1604 the valves open allowing liquid or air to freely flow through. When connector 1620 is removed from mating connector 1604 the valves close and prevent fluid from flowing out of the liquid and air conduits.

In some embodiments, mating connector 1604 has valves (not shown) located therein. In this manner, when valved connector 1620 connects to mating connector 1604, valves in valved connector 1620 open and valves in mating connector 1604 open allowing the flow of air and liquid therethrough. Upon disconnecting of valved connector 1620 and mating connector 1604, valves in valved connector 1620 close preventing fluid flow therethrough and valves in mating connector 1604 close preventing fluid flow therethrough.

In some embodiments, a shut-off valve (not shown), such as, for example, a float valve, is located proximate the air connection in connector 1611. In this way, when liquid in mobile bulk refill unit reaches a maximum height, the valve shuts off the air conduit which prevents fluid from flowing out of the container into the air conduit. All of the embodiments disclosed herein that have air conduit connectors or vents may include a shut-off valve to prevent liquid from flowing into the air conduit or out of an air vent valve.

During operation, switch is moved to a position that pumps liquid from stationary bulk refill container 1602 into mobile bulk refill container 1610 and air flows from the mobile bulk refill container to the stationary bulk refill container 1602. When the mobile bulk refill container 1610 is filled to a desired level, the pump is shut off.

In some embodiments, mobile bulk refill containers are clear or opaque and the level of liquid in the container may be seen through the container. In some embodiments, a window (not shown) is included in the mobile bulk refill containers so that the volume of liquid in the container may be seen through the window. In some embodiments, the window extends along the length of the mobile bulk refill containers. In some embodiments, the window extends along the height of the mobile bulk refill containers and in some embodiments, along at portion of the height of the mobile bulk refill containers.

In embodiments disclosed herein, the pumps for pumping fluid may have sensors (not shown) for sensing a parameter, such as, for example pressure or a volume of fluid. When the parameter is at a set-point, the pump automatically shuts off. For example, if the parameter is pressure and a set pressure is met, the systems will determine that the container is full and shut of the pump. Similarly, of the parameter is a volume of fluid, when the set volume is reached, the pump is shut off. Likewise, if the parameter is time, once a certain time has passed, the pump automatically shuts off. In some embodiments, the parameter is a height of the liquid in the container, and when a desired height is reached, the pump shuts off.

In sum embodiments, disclosed herein, the pump is connected to the air conduit and pumps air from one container to the other and the liquid flows through the liquid conduit due to the positive pressure and/or negative pressure in the containers.

Figure 17:
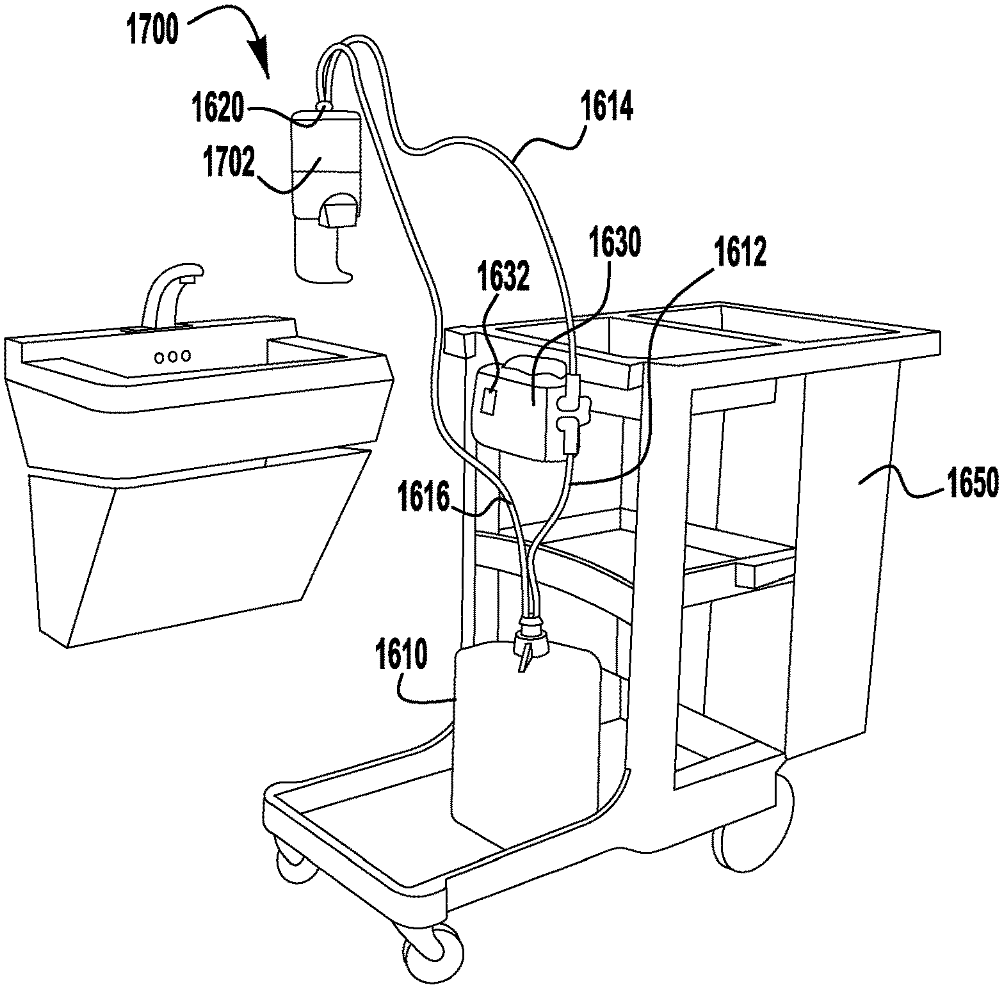
FIG. 17 illustrates an exemplary embodiment of a second portion of a closed loop refilling system.
Figure 18:
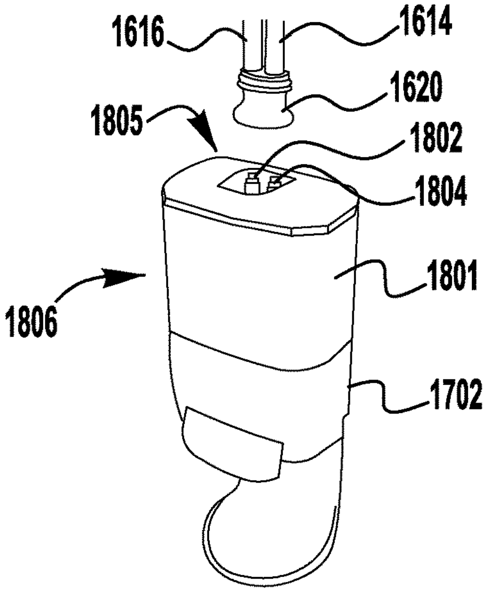
FIG. 18 illustrates an exemplary refillable dispenser and connector for a closed loop refilling system.

FIG. 17 illustrates an exemplary embodiment of a second portion of a closed loop refilling system 1700. Mobile bulk refill container 1610 is located on a cart 1650 and transported to a location having a dispenser 1702 installed in the wall. Dispenser 1702 includes a container 1801 (FIG. 18). Container 1801 includes a connector 1805 having a liquid inlet 1804 and an air outlet 1802. Container 1801 has a pump (not shown) attached thereto for dispensing fluid. In some embodiments, container 1801 and pump (not shown) are readily removable and replaceable and are commonly referred to as a refill unit 1806. Accordingly, the refill unit may be removed and replaced with another refill unit and also may be refilled from mobile bulk container 1601 as described herein. This allows the refill unit 1806 to be removed and replaced if desired. In some embodiments, the refill unit 1806 is replaced after a set number of times that it is refilled from mobile bulk refill container 1610, or if a malfunction occurs with the pump, or after a selected time period.

As described above, mobile bulk refill container 1610 has a connector 1611 connected to liquid conduit 1612 and air conduit 1616, which extends to valved connector 1620. Liquid conduit 1612 connects to reversible pump 1630. Reversible pump 1630 includes three position switch 1632. Extending from pump 1630 to valved connector 1620 is liquid conduit 1614.

Valved connector 1620 is a dual connector and includes valves (not shown). Valved connector 1620 is connected to mating connector 1805 on dispenser 1702. When valved connector 1620 is connected to mating connector 1805 the valves open allowing liquid or air to freely flow through. When connector 1620 is removed from mating connector 1805 the valves close and prevent fluid from flowing out of the liquid and air conduits.

In some embodiments, mating connector 1805 has valves (not shown) located therein. In this manner, when valved connector 1620 connects to mating connector 1805, valves in valved connector 1620 open and valves in mating connector 1805 open allowing the flow of air and liquid therethrough. Upon disconnecting of valved connector 1620 and mating connector 1805, valves in valved connector 1620 close preventing fluid flow therethrough and valves in mating connector 1805 close preventing fluid flow therethrough. In some embodiments dispenser 1702 includes a lid (not shown) that covers connector 1805 when the dispenser 1702 is not being refilled.

Once valved connector 1620 is connected to mating connector 1805, switch 1630 is moved to the fill dispenser position and the dispenser is filled with fluid. As described above, the pump 1630 may be stopped manually or automatically based on a sensed parameter.

Figure 19A:
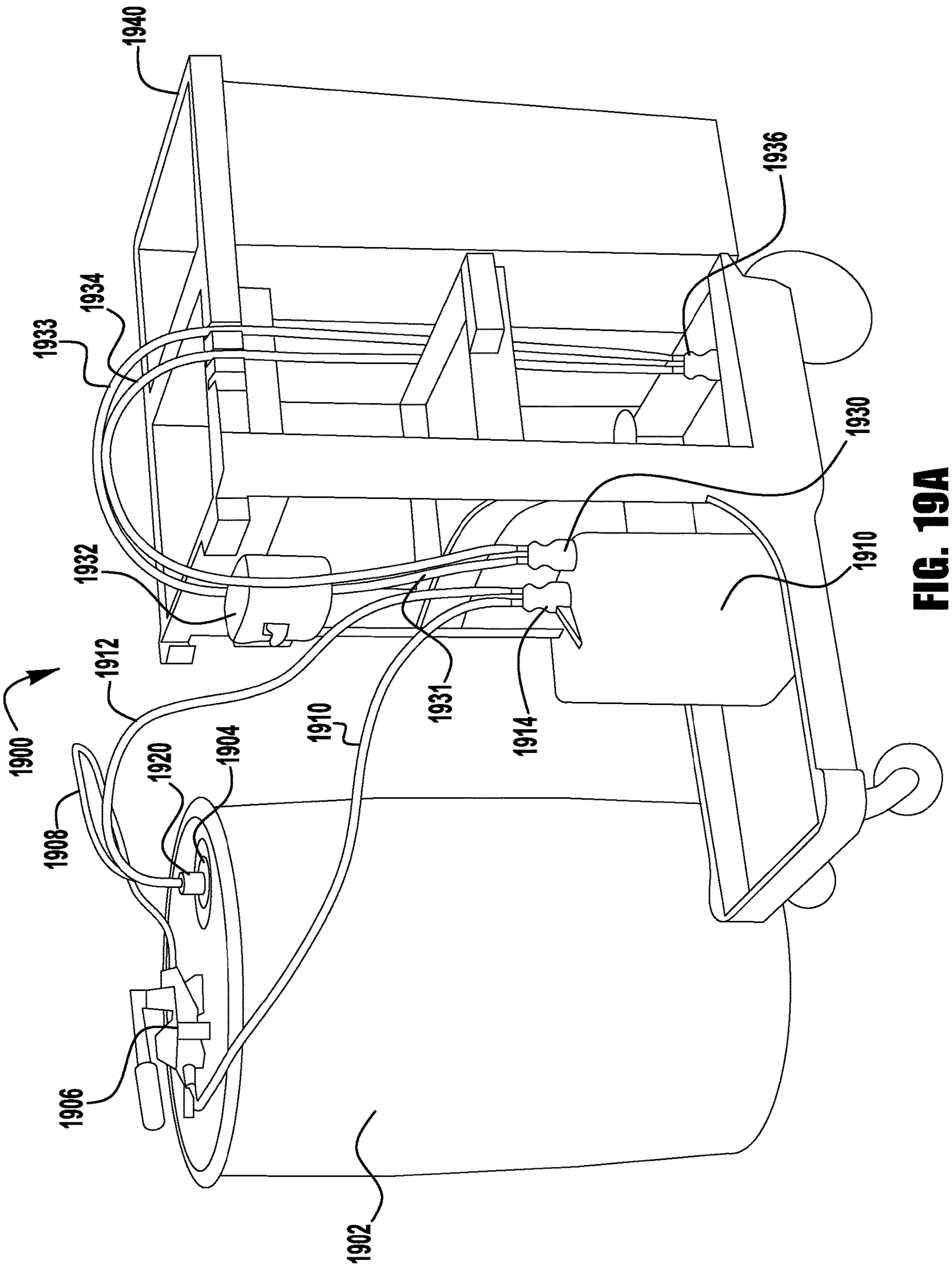
FIG. 19A illustrates an exemplary embodiment of part of a closed loop refilling system for filling a mobile bulk refill container.

FIG. 19A illustrates an exemplary embodiment of part of a closed loop refilling system 1900 for filling a mobile bulk refill container 1910. In this exemplary embodiment, stationary bulk refill container 1902 incudes a connector with two fittings 1904, 1920. One end of an air conduit 1912 is connected to fitting 1904 and the second end is connected to valved connector 1914. One end of a liquid conduit 1908 is connected to fitting 1920. A dip tube (not shown) is located inside of stationary bulk refill container 1902 and extends to near the bottom of the stationary bulk refill container 1902 allowing liquid to be drawn out of stationary bulk refill container 1902. The second end of liquid conduit 1908 is connected to the liquid inlet of pump 1906. In this exemplary embodiment, pump 1906 is a manual pump, however, pump 1906 may be any pump, such as, for example, those described herein. A first end of liquid conduit 1910 is connected to the outlet of pump 1906 and the second end is connected to valved connector 1914. Valved connector 1914 is connected to mobile bulk refill container 1910 with a mating connector (not shown) as described above.

During operation, a user positions cart 1940 near stationary bulk refill container 1902 and connects valved connector 1914 to mobile bulk refill container 1910 and starts pumping pump 1906 until mobile bulk refill container 1910 is filled to a desired level. As liquid is pumped into mobile bulk refill container 1910, air flows out of mobile bulk refill container 1910 through conduit 1912 and into stationary bulk refill container 1902.

Mobile bulk refill container 1910 has a second connector 1930. A first end of a liquid conduit 1931 is connected to connector 1930 and the second end is connected to the liquid inlet of pump 1932. A first end of a second liquid conduit 1933 is connected to the outlet of liquid pump 1932 and the second end is connected to valved connector 1936. A first end of an air conduit 1616 is connected to connector 1930 and a second end is connected to valved connector 1936.

Once the mobile bulk refill container 1910 is filled to a desired level, cart 1940 may be pushed to dispenser locations and the dispensers may be refilled as described herein.

Figure 19B:
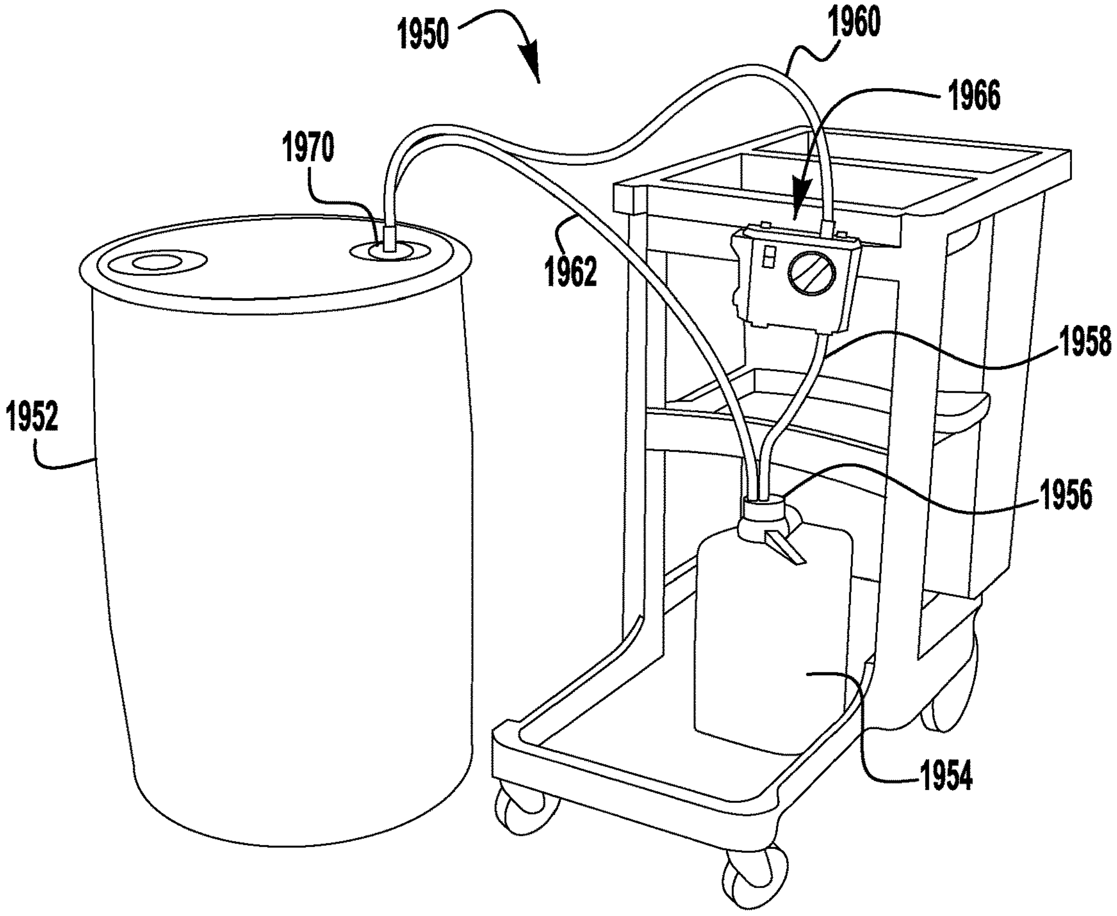
FIG. 19B illustrates an exemplary embodiment of part of a closed loop refilling system for filling a mobile bulk refill container.

FIG. 19B illustrates another exemplary embodiment of part of a closed loop refilling system 1950 for filling a mobile bulk refill container 1954. System 1950 is similar to the embodiments described above and includes a mobile bulk refill container 1954 that has a connector 1956, a pump 1966, liquid conduits 1958, 1960, an air conduit 1962 and valved connector 1970. Valved connector 1970 is connected to a fitting (not shown) on stationary bulk container 1952. The term "stationary" as used herein does not mean that the stationary bulk refill container is not movable, only that it is typically set in place and not transported around to refill dispensers.

Figure 20:
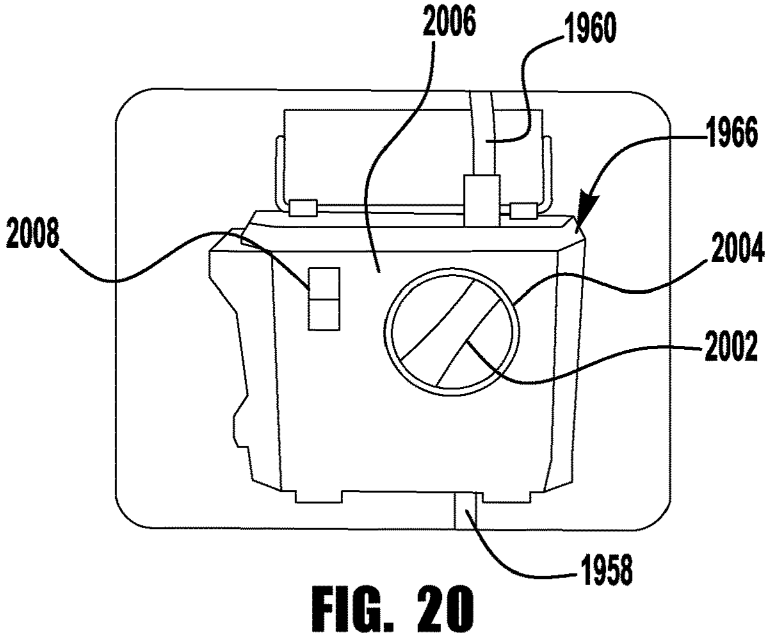
FIG. 20 illustrates an exemplary pump system for a closed loop refilling system.

Pump 1966 includes an on/off switch 2008 (FIG. 20) and a two-position selector switch that may be positioned in a first position 2004 to pump fluid in a first direction from the stationary bulk refill container 1952 to the mobile bulk refill container 1954 and in a second position 2006 to pump fluid in a second direction from the mobile bulk refill container 1954 to a dispenser (not shown).

Figure 21:
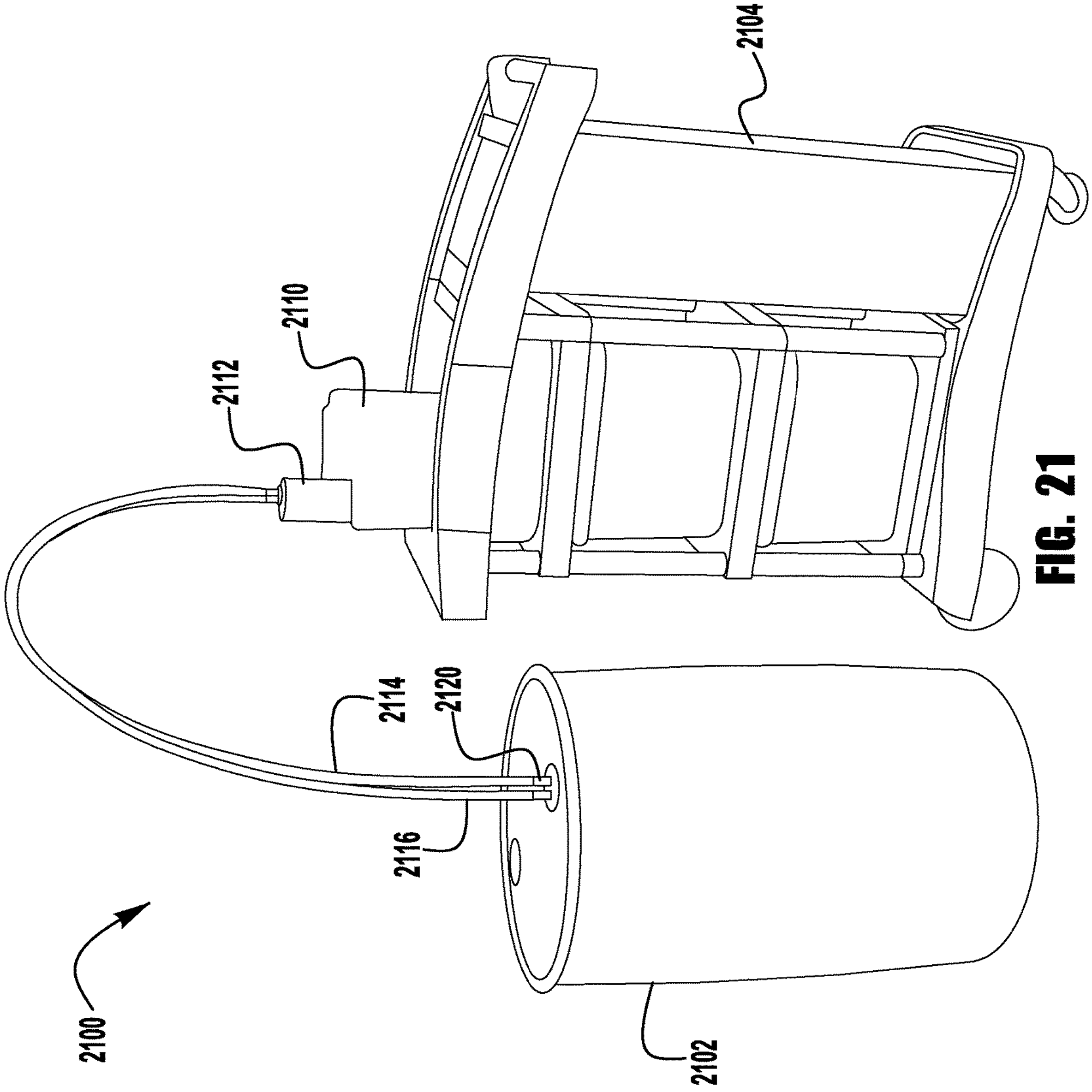
FIG. 21 illustrates another exemplary embodiment of a first portion of a closed loop system for filling a mobile bulk refill container.
Figure 22:
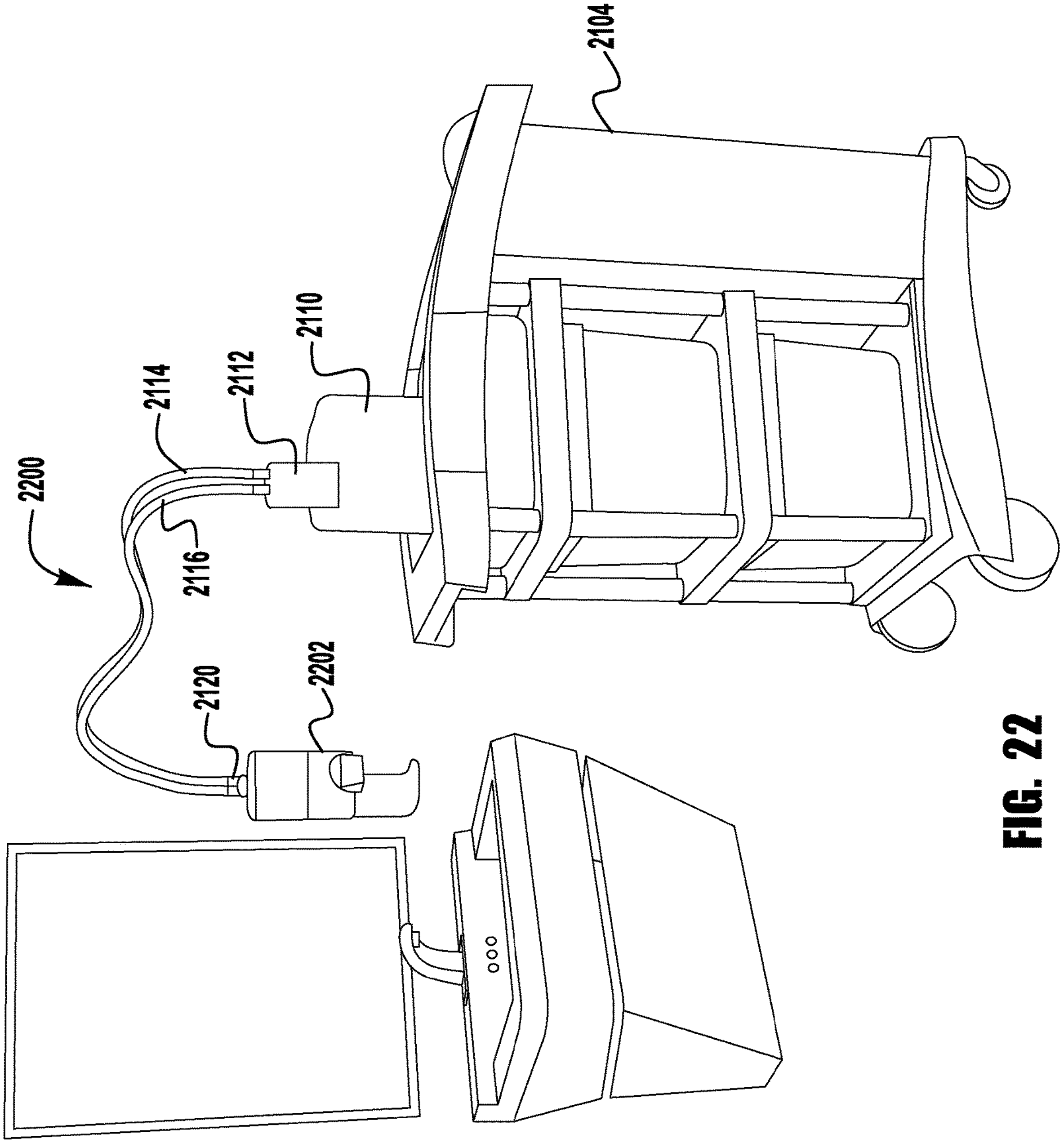
FIG. 22 illustrates another exemplary embodiment of a second portion of a closed loop refilling system.

FIGS. 21 and 22 illustrate another exemplary embodiment of a closed loop system 2100 for filling a mobile bulk refill container 2110. In this exemplary embodiment, mobile bulk refill container 2110 has a pump 2112 attached thereto. Pump 2112 may be any type of pump, and in the present embodiment is a reversible direction pump configured to pump liquid from stationary bulk refill container 2102 to a mobile bulk refill container 2110 and from mobile bulk refill container 2110 to a dispenser 202. Connected to a first port of the liquid pump 2112 is a liquid conduit 2116 and connected to a second port of the liquid pump 2112 is a dip tube (not shown) that extends into the bottom of mobile bulk refill container 2110. Closed loop system 2100 includes a valved connector 2120 that is connected to the liquid conduit 2116 and air conduit 2114. The second end of air conduit 2114 is in fluid communication with the interior of mobile bulk refill container 2110.

FIG. 21 illustrates mobile bulk refill unit container 2110 being in fluid communication with stationary bulk refill container 2102. Once connected to stationary bulk refill container 2102, liquid may be pumped from stationary bulk refill container 2102 to mobile bulk refill container 2110 by operating pump 2112 in a first direction. Mobile bulk refill container 2110 is located on cart 2104 and may be easily transported to a plurality of locations having one or more dispensers 2202 located therein. Once there, valved connector 2120 may be connected to dispenser 2202 and liquid may be pumped into the dispenser 2202. As discussed above, air located within mobile bulk refill container 2110 is transferred to stationary bulk refill container 2102 while filling mobile bulk refill container 2110. Similarly, air located within dispenser 2202 is transferred to mobile bulk refill container 2110 while filling dispenser 2202. As with the other dispenser containers disclosed herein, the container may include a filter (not shown) for filtering air that enters the container of the dispenser 2202 when the liquid is being dispensed to a user. Accordingly, unfiltered ambient air, which may be in the ambient air is prevented from entering the closed loop system.

Figure 23:
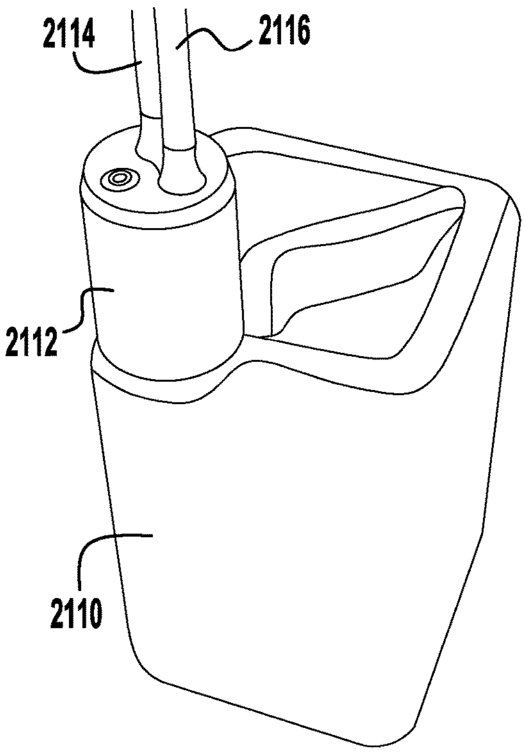
FIG. 23 is an exemplary bulk refilling container and pump.
Figure 24:
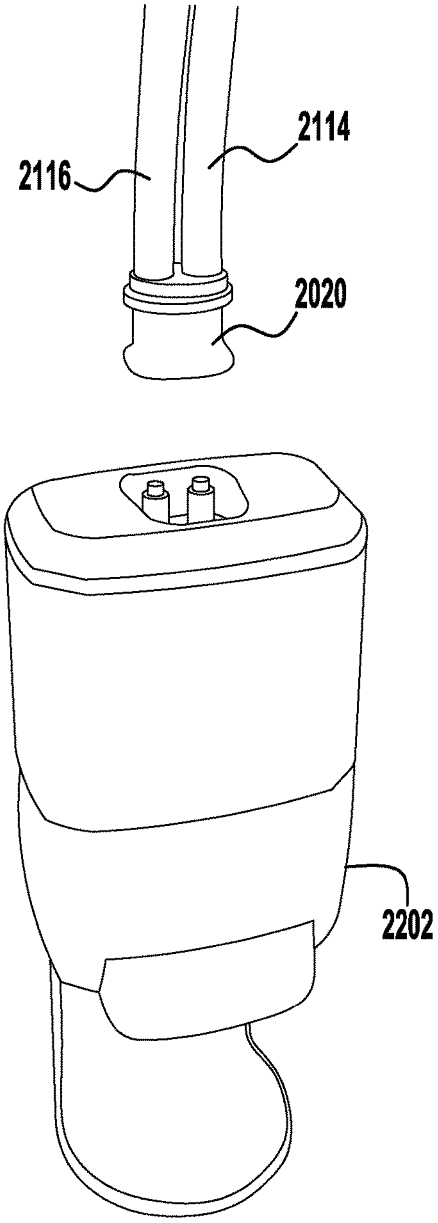
FIG. 24 is exemplary embodiment of a refillable dispenser and valved refill connector.

FIG. 23 is an enlarged view of the mobile bulk refill container 2110, pump 2112, liquid conduit 2116 and air conduit 2114. FIG. 24 is an enlarged view of refillable dispenser 2202, valved connector 2020, air conduit 2214 and liquid conduit 2116.

Figure 25:
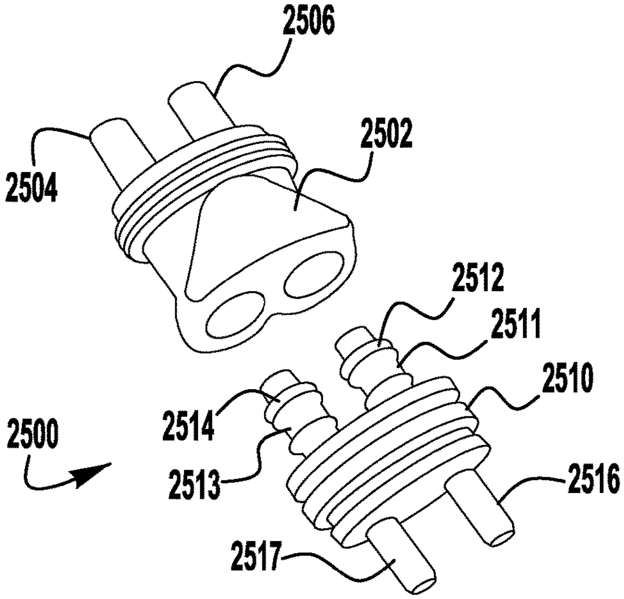
FIG. 25 is an exemplary embodiment of a valved connector.

FIG. 25 is an exemplary embodiment of a connection system 2500 that includes a valved connector 2502 having a first connector 2506 for connecting to a liquid conduit and a second connector 2504 for connecting to an air conduit and a mating connector 2510 having a first connector 2516 for passing liquid therethrough and a second connector 2517 for communicating air. Valves located within valved connector 2502 are opened when projections 2511 and 2513 are inserted into valved connector 2502. Projections 2511 and 213 include sealing members 2512 and 2514 for sealing within valved connector 2502. When projections 2511 and 2513 are removed, the valves in valved connector 2502 is separated from mating connector 210.

Figure 26:
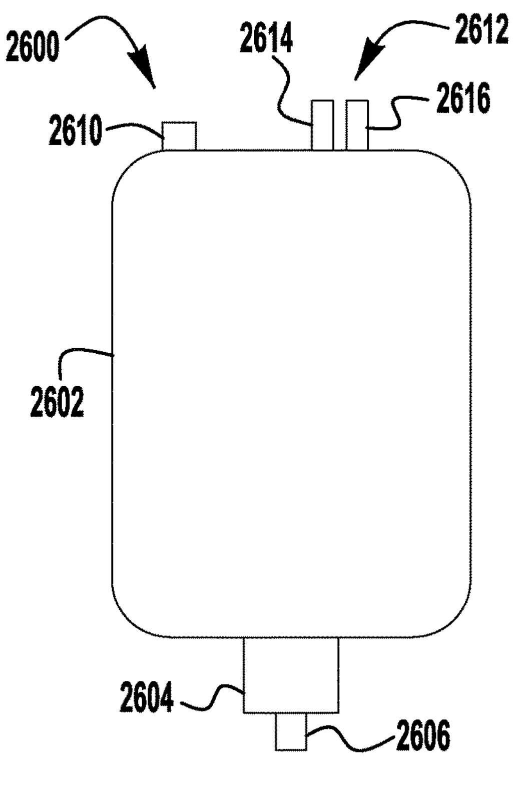
FIGS. 26-28 are exemplary embodiments of a refillable dispensers.
Figure 27:
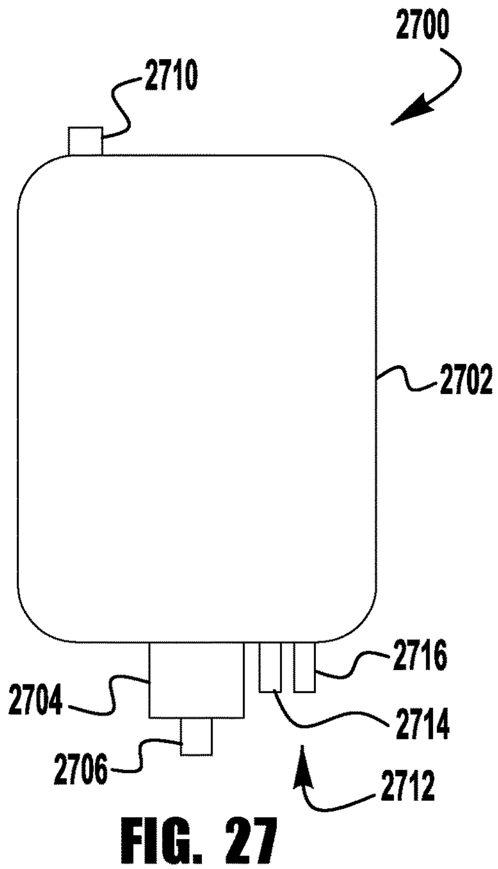
Figure 28:
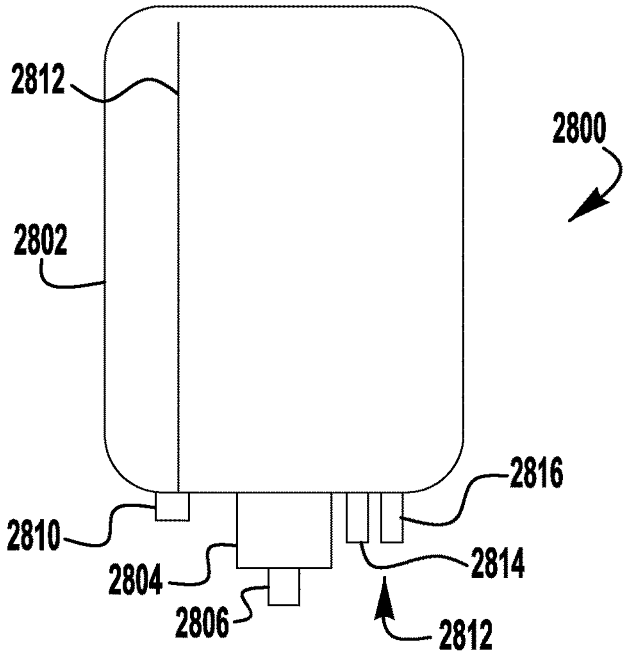

FIGS. 26-28 are exemplary embodiments of refill units 2600, 2700, and 2800 that may be used in the exemplary embodiments disclosed herein. Refill unit 2600 includes a container 2602 having a pump 2604 connected thereto. Connected to pump 2604 to a nozzle 2606. Locate on top of the container is an optional vent 2610. Vent 2610 may be a filtered vent, a valved vent or combinations thereof. In addition, located on the top of container 2602 is a mating connector 2612 for receiving a valved connector (not shown). mating connector 2612 includes a liquid inlet connector 2612 and an air outlet connector 2614. In some embodiments, a float valve (not shown) is located proximate the air outlet connector 2614, which seals of the air outlet connector 2614 when the liquid level in container 2602 reaches the float valve.

Refill unit 2700 includes a container 2702 having a pump 2704 connected thereto. Connected to pump 2704 to a nozzle 2706. Locate on top of the container is an optional vent 2710. Vent 2710 may be a filtered vent, a valved vent or combinations thereof. In addition, located on the bottom of container 2702 is a mating connector 2712 for receiving a valved connector (not shown). Mating connector 2712 includes a liquid inlet connector 2712 and an air outlet connector 2714. In this exemplary embodiment, mating connector 2712 is a valved mating connector. When separated from a valved connector (not shown), valves located in fluid communication with air outlet connector 2714 and liquid inlet connector 2712 close and seal off air outlet connector 2714 and liquid inlet connector 2712.

Refill unit 2800 includes a container 2802 having a pump 2804 connected thereto. Connected to pump 2804 to a nozzle 2806. Locate on the bottom of the container is an optional vent 2810. Vent 2710 may be a filtered vent, a valved vent or combinations thereof. Extending upward from vent 2810 is a tube 2812 that ends proximate the top of container 2802. In addition, located on the bottom of container 2802 is a mating connector 2812 for receiving a valved connector (not shown). Mating connector 2812 includes a liquid inlet connector 2812 and an air outlet connector 2814. In this exemplary embodiment, mating connector 2812 is a valved mating connector. When separated from a valved connector (not shown), valves located in fluid communication with air outlet connector 2814 and liquid inlet connector 2712 close and seal off air outlet connector 2814 and liquid inlet connector 2812.

Various combinations of the above features may be used alone or in conjunction with others in certain embodiments. In addition, in some exemplary embodiments the refill units are readily removable and replaceable, but also refillable in place. Accordingly, if there is a problem with, for example, a pump or clogged nozzle, or if a certain time between replacements has occurred, the refill unit may be removed and replaced. However, refill unit may be refilled in place through the exemplary refilling systems disclosed herein.

Figure 29:
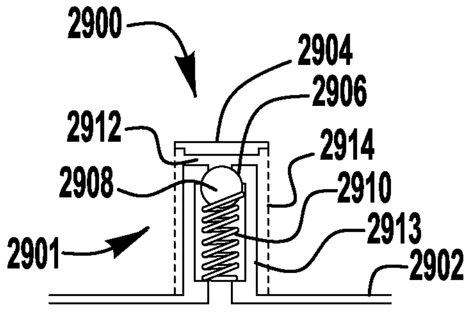
FIG. 29 is an exemplary embodiment of a container vent having a one-way air inlet valve.

FIG. 29 is an exemplary embodiment of a container vent 2900 having a one-way inlet valve 2901. Vent valve 2901 may be any type of one-way valve that has a cracking pressure sized to allow air to flow into the container 2902 when a desired vacuum pressure is crated inside of the container 2902. In this exemplary embodiment, valve 2902 is located within housing 2913 and is a ball valve and includes a spring 2910, a ball 2908 and a valve seat 2906. Housing 2913 is secured to an opening in container 2902 and includes an optional screen 2914. An air passage 2912 allows air to flow into the housing 2913, and when ball 2908 moves off of valve seat 2906 air can flow into the container 2902. Container vent 2900 or a similar container vent may be used with any of the exemplary embodiments disclosed herein.

Figure 30:
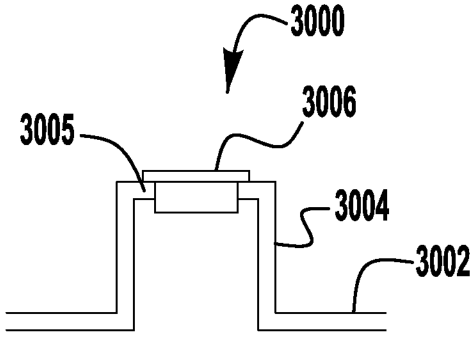
FIG. 30 is an exemplary embodiment of a container vent having a filter.

FIG. 30 is an exemplary embodiment of a container vent having a filter 3000. In this exemplary embodiment, vent housing 3004 is secured to container 3002 and has an opening 3005 located therethrough. A filter 3006 is secured to opening 3005. Filter 3006 has a porosity that is sufficient to prevent bacterial from passing through the filter. In some embodiments, filter 3006 has a porosity of about 0.045 μm. In an exemplary embodiment, filter 3006 is a nylon syringe filter having a porosity of 0.45 μm and has a diameter of about 25 mm Thus, any air flowing into container 3002 is free from contaminants and/or bacteria.

Figure 30A:
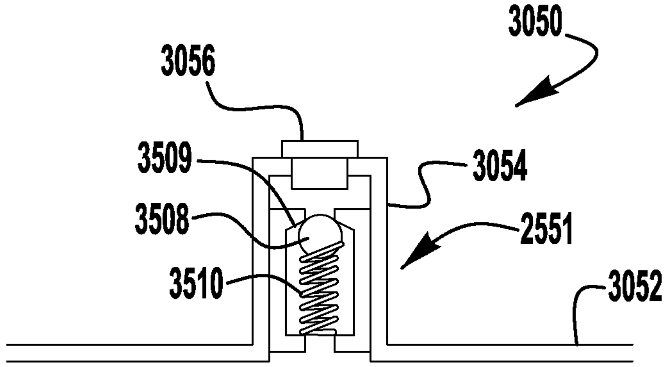
FIG. 30A is an exemplary embodiment of a container having a vent with a one-way air inlet valve and a filter.

FIG. 30A is an exemplary embodiment of a container vent 3050 having a one-way inlet valve 3551 and filter 3056. Vent valve 3551 may be any type of one-way valve that has a cracking pressure sized to allow air to flow into the container 3052 when a desired vacuum pressure is crated inside of the container 35052. In this exemplary embodiment, valve 3551 is located within housing 3054 and is a ball valve and includes a spring 3510, a ball 3508 and a valve seat 3509. Housing 3054 is secured to an opening in container 3052. Air can flow through filter 3556 and housing 3540 when ball 3508 moves off of valve seat 3509 and into the container 3502. Filter 3006 has a porosity that is sufficient to prevent bacterial from passing through the filter. In some embodiments, filter 3006 has a porosity of about 0.045 μm. In an exemplary embodiment, filter 3006 is a nylon syringe filter having a porosity of 0.45 μm and has a diameter of about 25 mm Thus, any air flowing into container 3052 is free from contaminates and/or bacteria. Container vent 3050 or a similar container vent may be used with any of the exemplary embodiments disclosed herein.

Figure 30B:
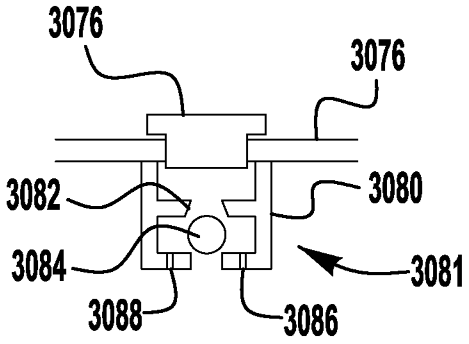
FIG. 30B is an exemplary embodiment of a container having a vent with a shut-off valve and a filter.

FIG. 30B is an exemplary embodiment of a container vent having a filter 3000 and a shut off valve 3081. In this exemplary embodiment, a filter 3076 is secured to an opening in container 3076. Filter 3076 has a porosity that is sufficient to prevent bacterial from passing through the filter. In some embodiments, filter 3076 has a porosity of about 0.045 μm. In an exemplary embodiment, filter 3076 is a nylon syringe filter having a porosity of 0.45 μm and has a diameter of about 25 mm Thus, any air flowing into container 3076 is free from contaminates and/or bacteria.

In this exemplary embodiment, shut-off valve 3081 is a float valve 3081 includes a housing 3080 having a valve seat 3084, a floor 3086 and a plurality of openings 3088 through floor 3088 which allows air to flow into container 3076 when float ball 3084 is resting on floor 3088. Float ball 3084 floats in liquid and accordingly, when liquid in container 3076 reaches float ball 3084 it floats. If the liquid gets high enough, float ball 3084 seats against valve seat 3082 and seals off container vent 3075 preventing liquid from flowing out of the container 3076 or contacting filter 3076. All of the exemplary embodiments disclosed herein may include a shut-off valve, with or without the filter. Shut-off valve may be any valve that allows air to flow into the container, but shuts-off to prevent liquid from flowing out of the container through the valve.

Figure 31:
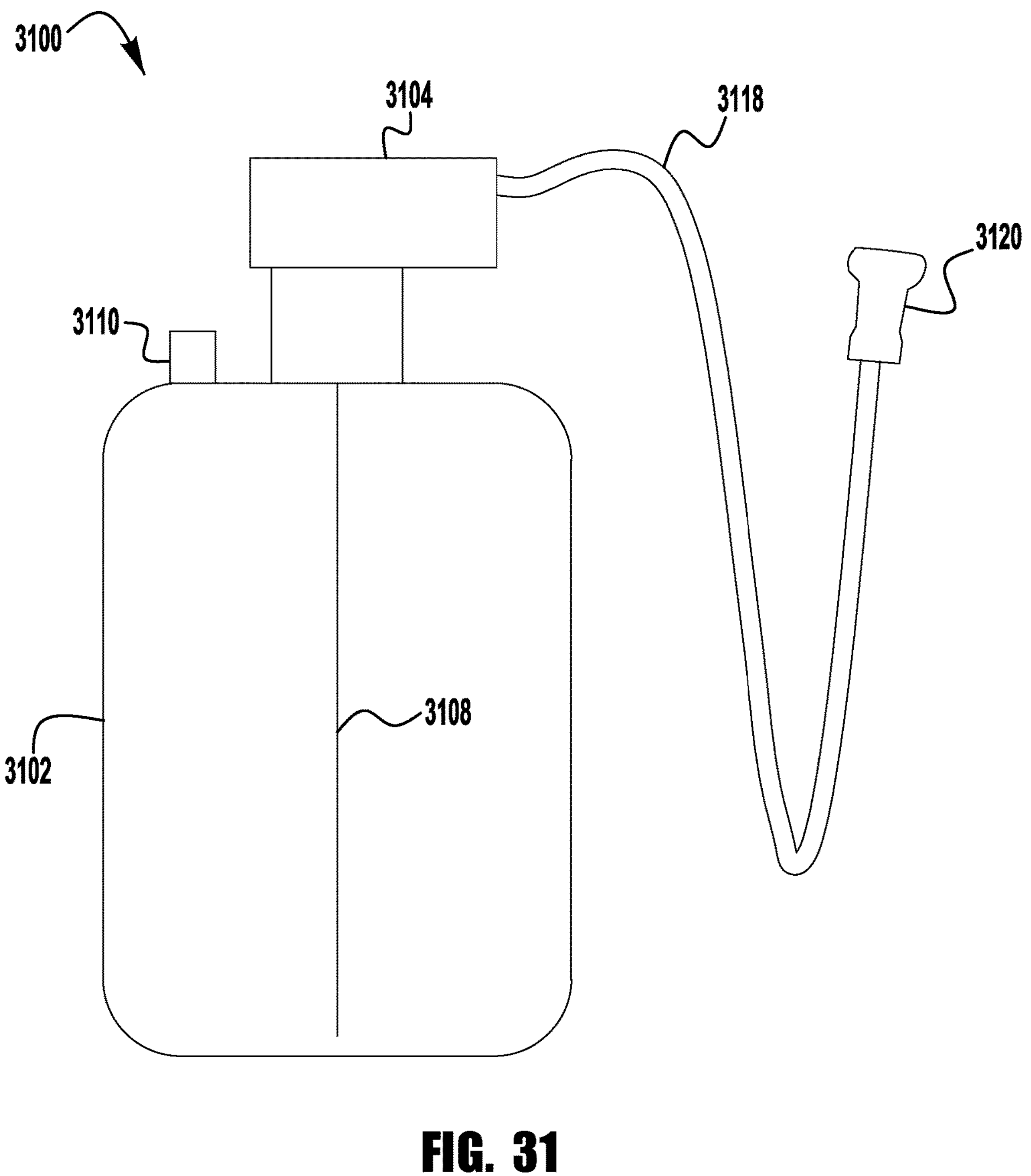
FIGS. 31-34 are exemplary embodiments of mobile bulk refill units.

FIGS. 31-34 are exemplary embodiments of sanitary mobile bulk refill units. FIG. 31 illustrates an exemplary embodiment of a sanitary mobile bulk refill unit 3100. Sanitary mobile bulk refill unit 3100 may be filled from a stationary bulk refill container (not shown) and/or may be used to fill a refillable refill unit (not shown), such as those described above. Sanitary mobile bulk refill unit 3100 includes, a container 3102, container vent 3110, which may be any of the container vents disclosed herein, such as, for example, a container vent and filter combination. Sanitary mobile bulk refill unit 3100, includes a valved quick connect 3120 connected to a liquid conduit 3118, which is attached to pump 3104. Pump 3104 may be a reversible pump allowing filling of stationary mobile bulk refill unit 3100 or a dispenser refill unit (not shown). Sanitary mobile bulk refill unit 3100 includes a dip tube 3108 extending from the pump to the bottom of container 3102.

In some embodiments, the pumps disclosed herein are battery operated pumps, and in some embodiments, contain rechargeable batteries.

Figure 32:
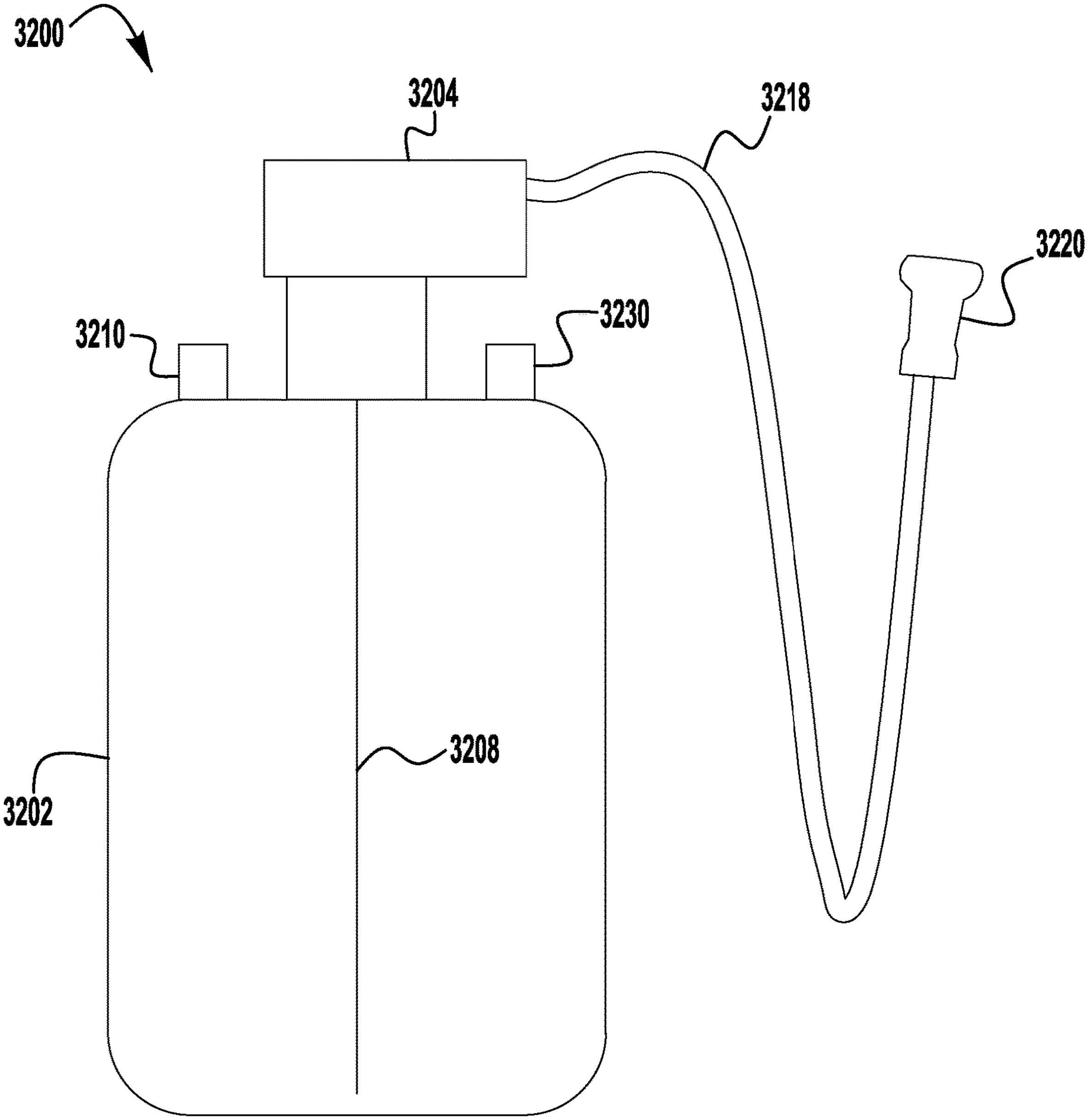

FIG. 32 illustrates an exemplary embodiment of a sanitary mobile bulk refill unit 3200. Sanitary mobile bulk refill unit 3200 may be filled from a sanitary bulk refill container (not shown) and/or may be used to fill a refillable refill unit (not shown), such as those described above. Sanitary mobile bulk refill unit 3200 includes, a container 3202, container vent 3210, which may be any of the container vents disclosed herein, such as, for example, a container vent and filter combination. Sanitary mobile bulk refill unit 3200, includes a valved quick connect 3220 connected to a liquid conduit 3218, which is attached to pump 3204. Sanitary mobile bulk refill unit 3200 includes a dip tube 3208 extending from the pump to the bottom of container 3202. In addition, sanitary bulk refill unit 3204 includes a fill port 3230 that may be used to fill sanitary mobile bulk refill unit 3200.

Figure 33:
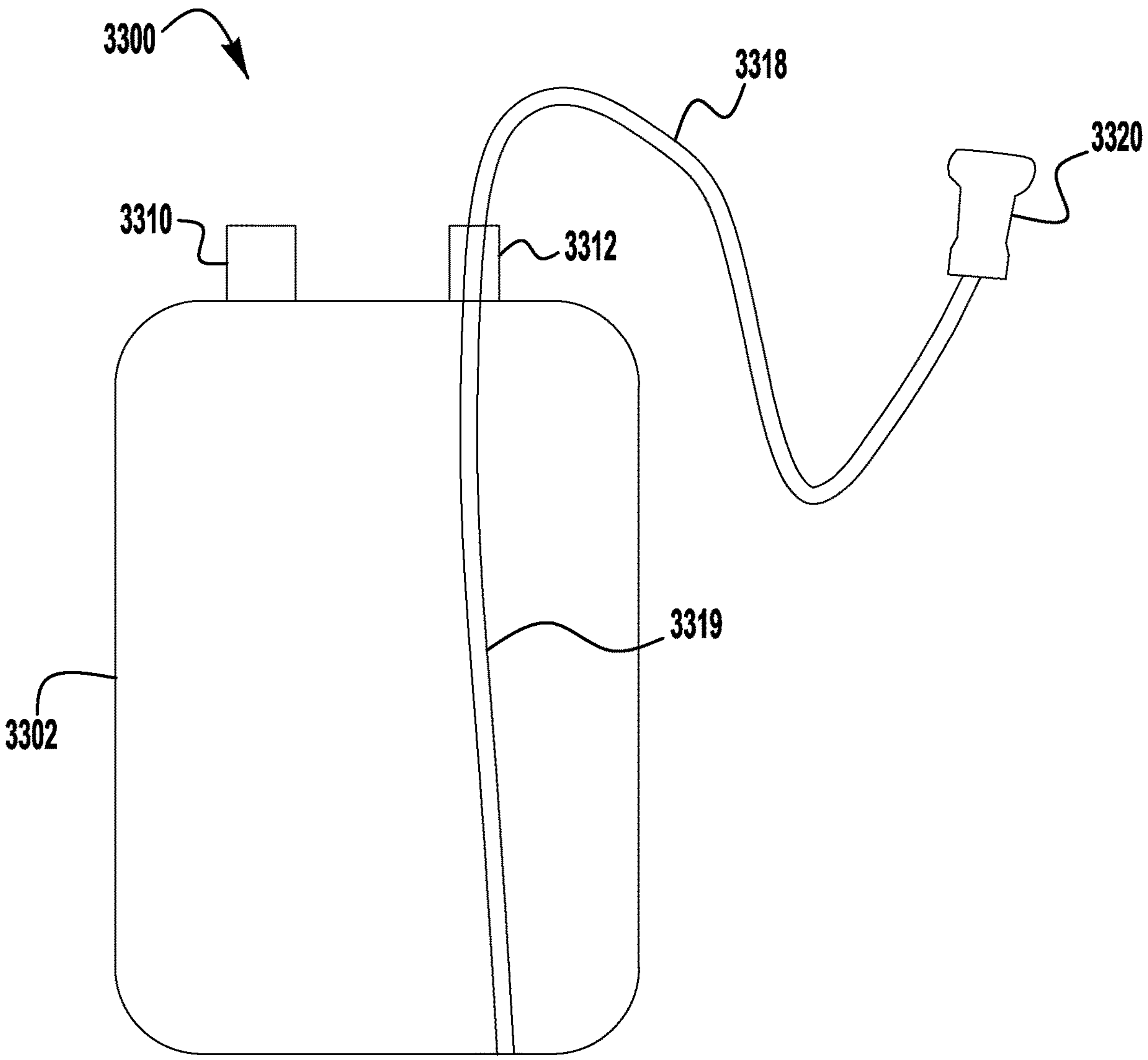

FIG. 33 illustrates an exemplary embodiment of a sanitary mobile bulk refill unit 3300. Sanitary mobile bulk refill unit 3300 may be filled from a sanitary bulk refill container (not shown) and/or may be used to fill a refillable refill unit (not shown), such as those described above. Sanitary mobile bulk refill unit 3300 includes, a container 3302, container vent 3310, which may be any of the container vents disclosed herein, such as, for example, a container vent and filter combination. Sanitary mobile bulk refill unit 3300, includes a valved quick connect 3320 connected to a liquid conduit 3318 that connects to container 3302 via connector 3312. A second liquid conduit 3319 that extends from connector 3312 to the bottom of container 3302. In this exemplary embodiment, valved connector 3320 may be connected to a pump (not shown) for filling container 3302 or for filling a dispenser. Not shown.

Figure 34:
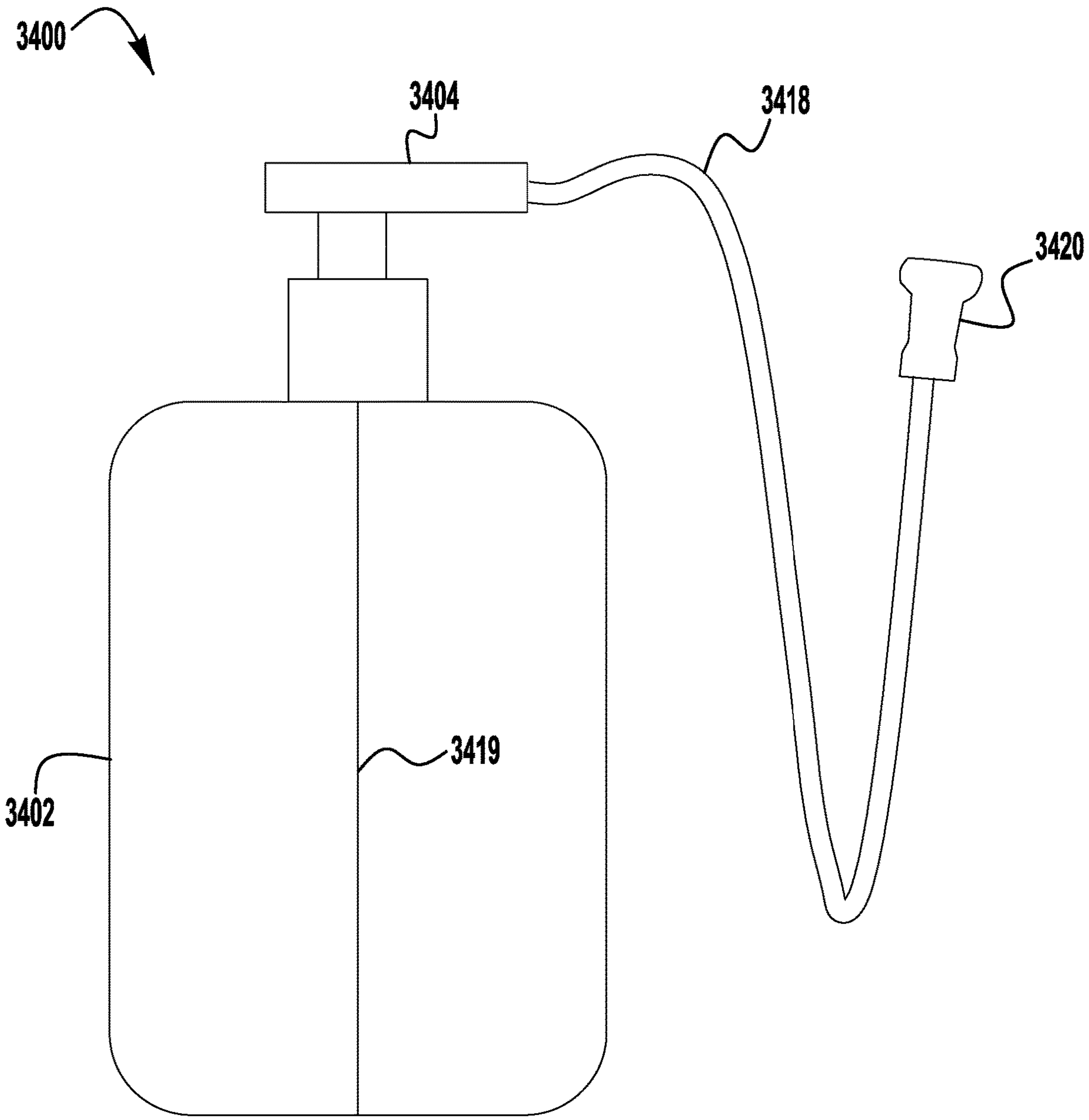

FIG. 34 illustrates an exemplary embodiment of a sanitary mobile bulk refill unit 3400. Sanitary mobile bulk refill unit 3400 may be filled from a sanitary bulk refill container (not shown) and/or may be used to fill a refillable refill unit (not shown), such as those described above. Sanitary mobile bulk refill unit 3400 includes, a container 3402. Sanitary mobile bulk refill unit 3200, includes a valved quick connect 3420 connected to a liquid conduit 3418, which is attached to pump 3404. Sanitary mobile bulk refill unit 3400 includes a dip tube 3419 extending from the pump to the bottom of container 3402. Pump 3404 is a manual pump and may include a means to vent the bottle, as well as a means to filter the air entering the container 342.

Figure 35:
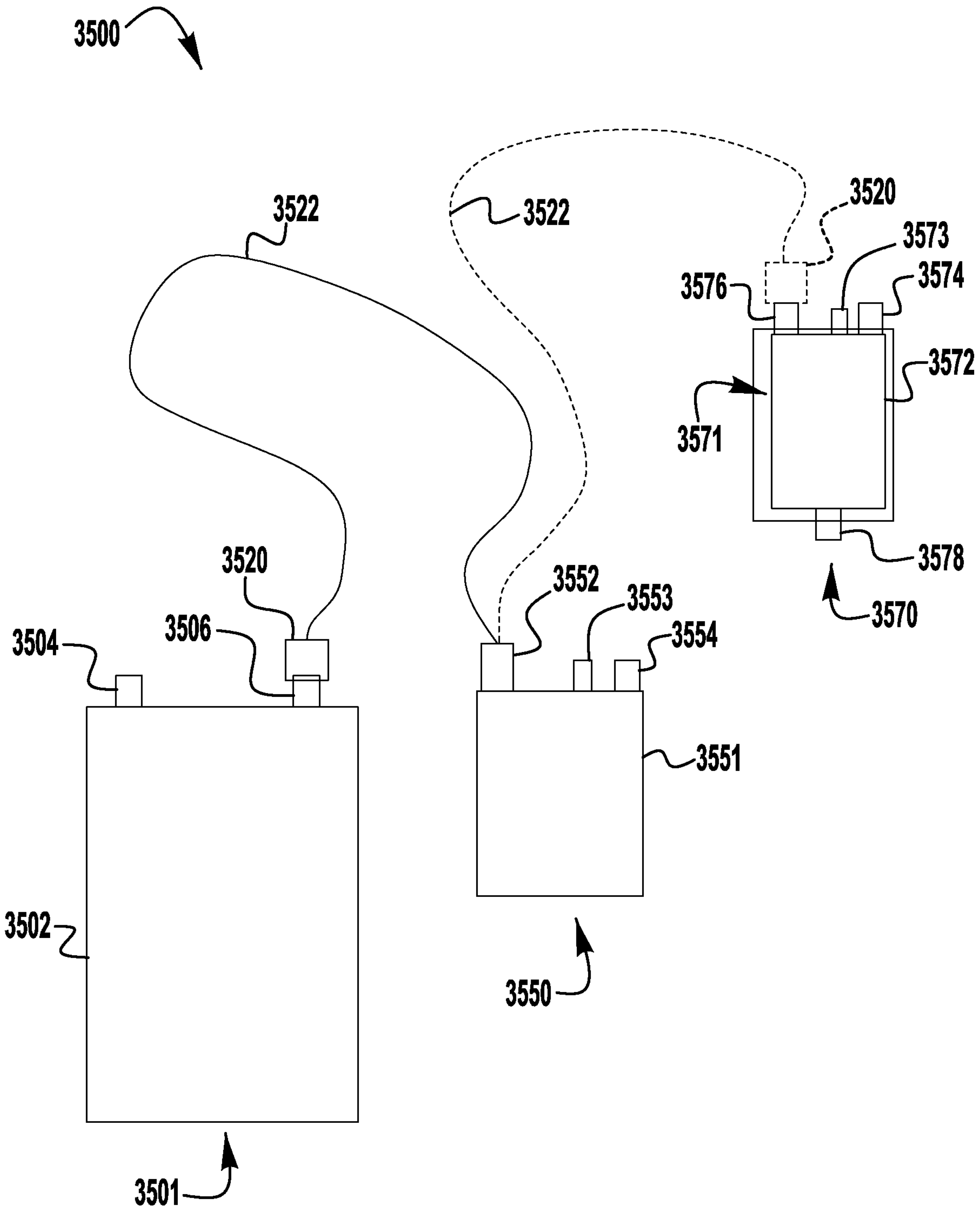
FIG. 35 is an exemplary embodiment of a sanitary bulk refill system.

FIG. 35 is an exemplary embodiment of a sanitary bulk refill system 3500. In this exemplary embodiment, a stationary bulk refill unit 3501 includes a container 3502, a vent 3504. Vent 3504 includes a filter, such as those described above, and may include a one-way valve, such as, for example, those described above. In addition, stationary bulk refill unit 3501 includes a mating connector 3506, such as, for example, those described above except with a single port, which may or may not be a valved mating connector.

Mobile bulk refill unit 3550 includes a container 3551 having a container vent 3554. Vent 3554 includes a filter, such as those described above, and may include a one-way valve, such as, for example, those described above. Mobile bulk refill unit 3550 also includes a pump 3552. A first end of liquid conduit 3522 is connected to pump 3552 and a second end is connected to valved connector 3520. Valved connector 3520 may be similar to the valved connectors described above, except for it is only a single port valved connector. Mobile bulk refill unit 35750 also includes a vent 3553 for allowing air to flow out of container 3553 when container 3551 is being filled.

Sanitary bulk refill system 3500 includes a dispenser 3570. Located at least partially within dispenser 3570 is a refill unit 3571. Refill unit 3571 is removable and replaceable, and is also refillable in place. Refill unit 3571 includes a pump/outlet 3578, a mating connector 3576, which may be a valved mating connector and releasably connects to valved connector 3520 when refilling refill unit 3571 in place. Refill unit 3571 includes a vent 3574 for allowing air into the container 3572. Vent 3574 includes a filter, and may include a one-way air inlet valve and may also include a float valve or other valve that prevents liquid from flowing into the filter. Refill unit 3571 also includes a vent 3573 for allowing air to flow out of container 3571 when container 3571 is being filled.

During operation, mobile bulk refill unit 3550 is positioned near stationary bulk refill unit 3501 and valved connector 3520 is connected to mating connector 3506. Pump 3552 is actuated so that fluid flows from stationary bulk refill unit 3501 into mobile bulk refill unit 3550. While fluid is flowing out of stationary bulk refill unit 3501, filtered air flows in through filtered vent 3504 and air flows out of mobile bulk refill unit 3550 through one-way outlet vent 3553. When mobile bulk refill unit 3550 is full, pump 3552 is shut off and valved connector 3520 is removed. The valves (not shown) in valved connector close and any fluid in liquid conduit 3522 remains in liquid conduit 3522.

Mobile bulk refill unit 3550 is then transported to one or more dispenser locations and valved connector 3520 is connected to mating connector 3576. Pump 3552 is activated and liquid is pumped from mobile bulk refill unit 3550 into container 3571. As liquid flows in, air flows out of container 3571 through one way-air outlet 3573. As liquid flows out of container 3551, filtered air flows in through filtered vent valve 3554.

Sanitary bulk refill system 3500 may be used in whole or in part. For example, the system may not have a stationary bulk refill unit 3501.

Accordingly, the only air that comes into contact with the liquid in the stationary bulk refill container 3502, the mobile bulk refill container 3551 or the refill unit container 3572 is filtered and free of bacteria and/or contaminants.

In some embodiments, the system is a "smart system". In such cases, one or more of the stationary bulk refill unit, the mobile bulk refill unit and the dispenser may include circuitry for reading and/or writing information and/or communication information with one another or with a central system. The central system may be located in a store, a headquarters, or a distributor.

In some embodiments, the mobile bulk refill unit includes a read/write device as well as a sensor for sensing the amount of fluid transferred to the mobile bulk refill unit 3550. The mobile bulk refill unit can read the amount of liquid that is in stationary bulk refill unit 3501 and write that information to memory on stationary bulk refill unit 3501. In some embodiments, when mobile bulk refill unit 3550 determines that all of the fluid in stationary bulk refill unit should have been transferred out of stationary bulk refill unit 3501, mobile bulk refill unit 3550 stops transferring fluid. In this way, unauthorized filling of stationary bulk refill unit 3501 may be prevented.

In addition, mobile bulk refill unit 3550 may include circuitry for reading product information from stationary bulk refill unit 3501 prior to pump actuation to ensure that only the correct product is transferred into mobile bulk refill unit 3550.

In addition, one or more of the stationary bulk refill unit 3501, the mobile bulk refill unit 3550 and the refill unit 3571 contain communication circuitry for communicating status information, such as low product. The communication may be Blu Tooth, WiFi, Cellular or the like. In some embodiments, when the bulk refill unit 3501 is low on product, an automatic message is sent to the purchaser or distributor informing of the need for additional product or automatically ordering the product.

In some embodiments, the mobile bulk refill unit 3550 is configured to read information from the dispenser 3570 or refill unit 3571 to ensure that a correct product is being dispensed into the refill unit. In some embodiments, the dispenser include circuitry configured to do the same tasks as described above with respect to the mobile bulk refill unit 3550 and, in systems without a stationary bulk refill unit 3501 can determine whether the mobile bulk refill unit 3550 should be empty and (with additional valving and circuitry) stop receiving fluid from the bulk refill system. In some embodiments, each time the refill unit 3571 is filled, a count or volume is written to memory on the refill unit 3571 or dispenser 3570. Once the count or volume reaches a selected count or volume, a signal is communicated to a user, distributor, or the like that the refill unit 3571 should be replaced with a new refill unit.

Figure 36:
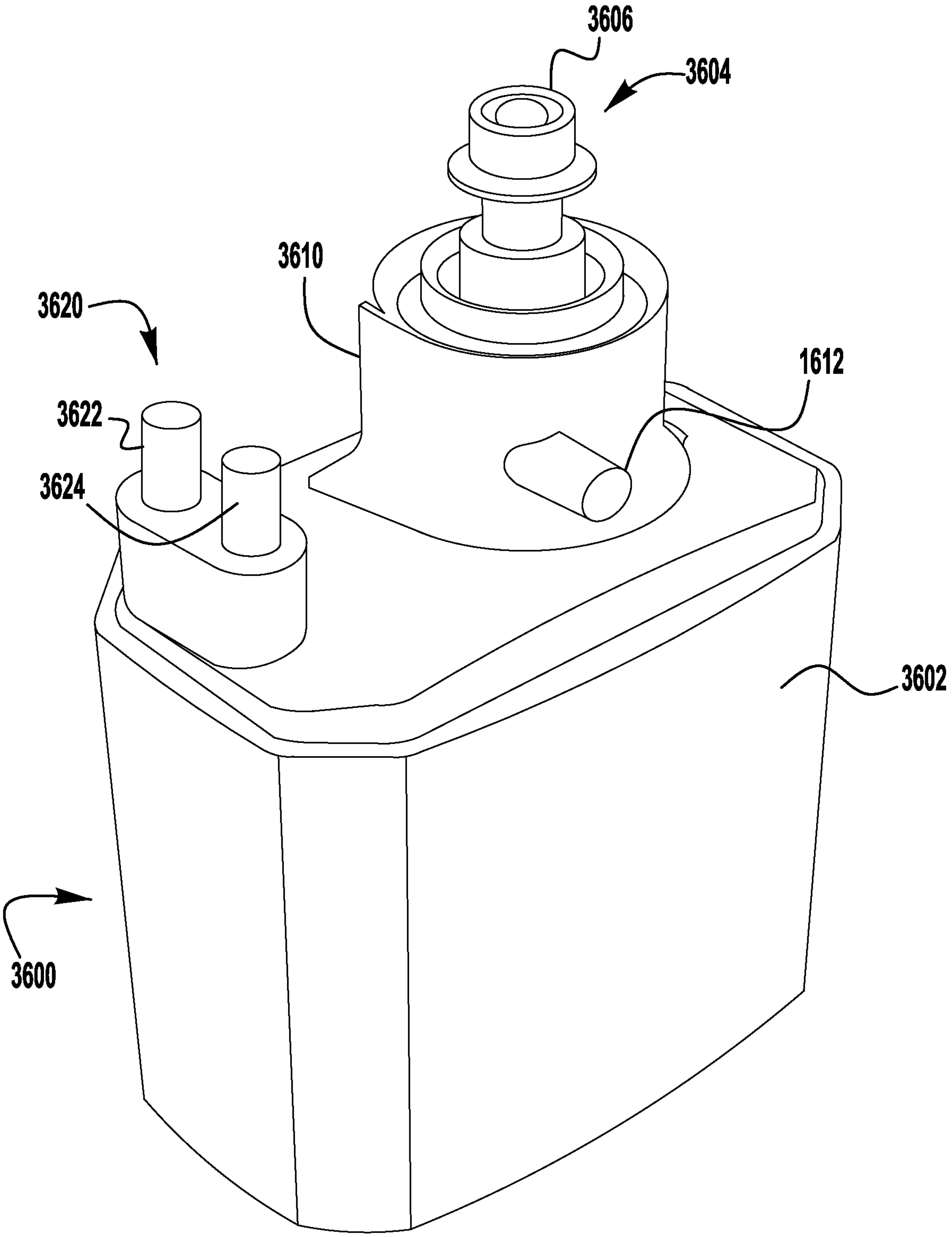
FIG. 36 is another exemplary embodiment of a refillable bottle for use in a sanitary bulk refill system.

FIG. 36 illustrates an exemplary embodiment of a refillable refill unit 3600 for a dispenser. Refillable refill unit 3600 includes a container 3605, a pump 3604 connected to a neck of the container 3605. The exemplary pump 3604 is a foam pump and has an outlet nozzle 3606. Located around pump 3604 is a key 3610. Key 3610 includes one or more features 3612 that allow a dispenser or refill system to determine whether the refillable refill unit 3600 is an authorized refillable refill unit. Features 3612 may be and electronic key, such as, for example, wireless communication circuitry, which may be, for example, an RFID device. In some embodiments, one or more features 3612 is one or more physical projections and/or indentations that form a physical key. In some embodiments, the one or more features are a combination of an electronic key and a physical key. Refillable refill unit 3600 also includes a valved refill port 3624 and an air outlet port 3622, which may be a valved air outlet port. In some embodiments, refillable refill unit 3600 also includes a filtered vent valve (not shown) that filters air entering container 3602 when liquid is pumped out of the container 3602.

Figure 37:
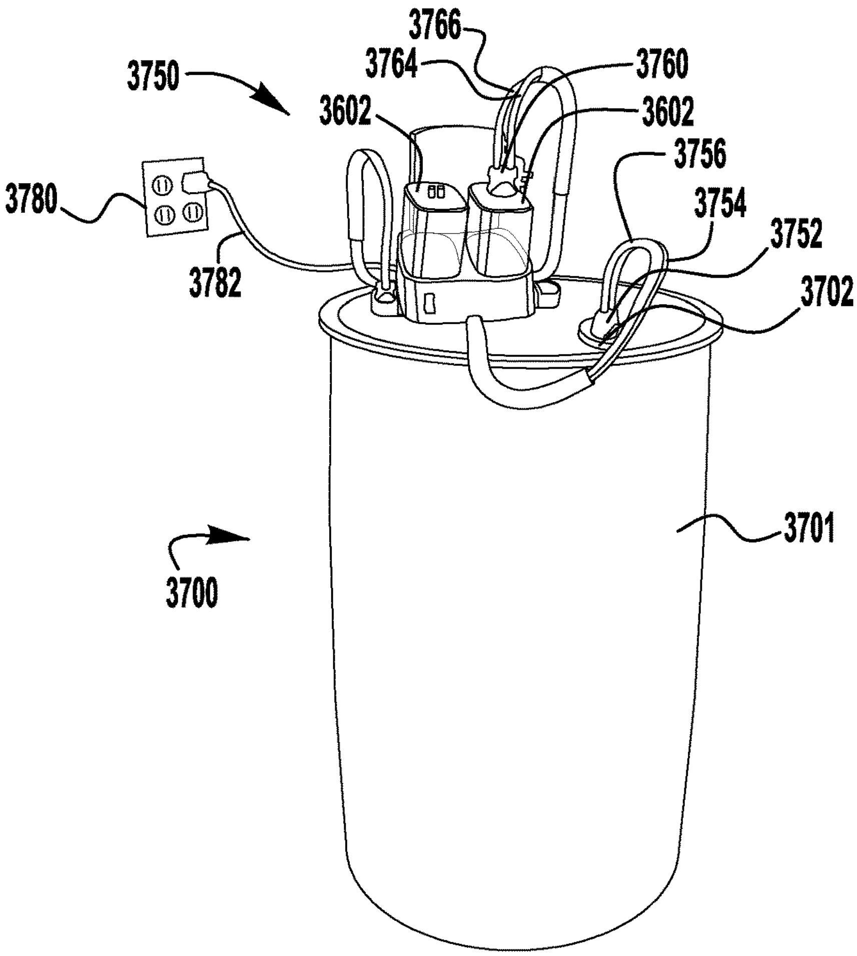
FIGS. 37 and 38 are another exemplary embodiment of a sanitary bulk refill system.
Figure 38:
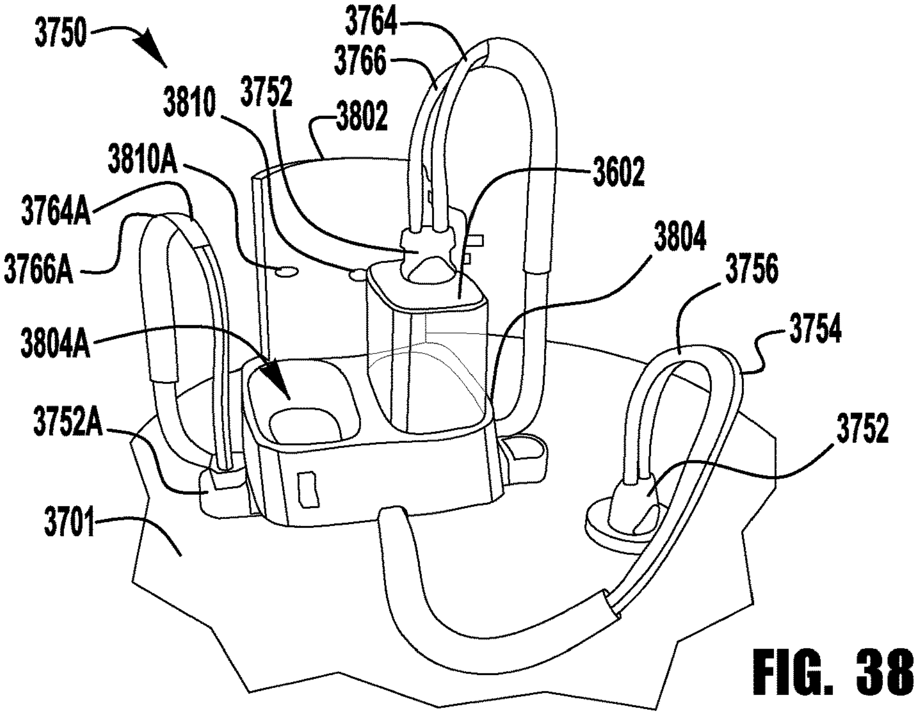

FIGS. 37 and 38 are another exemplary embodiment of a sanitary bulk refill system 3700. Sanitary bulk refill system 3700 includes a bulk storage container 3701. Bulk storage container 3701 includes a connector 3702. Connector 3702 may be any the types of connectors described above. Located on top of bulk storage container 3701 is a dual station refill system 3750. Dual station refill system 3750 has a housing 3802 that includes a first receptacle 3804 for receiving a first refillable refill unit 3602 and a second receptacle 3804A for receiving a second refillable refill unit (not shown). Extending from housing 3802 is a liquid inlet conduit 3754 and air outlet conduit 3756. Liquid inlet conduit 3754 and air outlet conduit 3756 have a valved connector 3752 located at one end. Valved connector 3752 connects to connector 3702. In some embodiments valve connector 3752 does not contain valves and is simply a connector. Located within housing 3802 is a pump (not shown) and circuitry (not shown) for controlling the refilling of refillable refill unit 3602. In addition, located partially within housing 3802 is a sensor 3810A. Sensor 3810A may be any sensor, such as for example, a level sensor which detects the level of fluid in refillable refill unit 3602. Other types of sensors may be used to detect the level fluid in the refillable refill unit 3602, such as for example, weight sensors, a color sensors used to detect a change in color of a refillable refill unit due to fluid, an ultrasonic sensor, infrared sensor, or the like may be used. Extending from housing 3802 is a first liquid refill conduit 3764 and air vent conduit 3766. One end of first liquid refill conduit 3764 and air vent conduit 3766 connect to a valved connector 3752. The other end of first liquid refill conduit 3764 connects to the outlet of the pump (not shown). Valve connector 3752 is connected to a liquid inlet conduit (not shown) of container 3602 and the air vent connector (not shown) connected to container 3602. Operation of the pump (not shown) causes fluid to flow from the bulk refill storage container 3701 through liquid Inlet conduit 3754 through first refill conduit 3764 and into first refillable refill container 3602. Air located in first refillable refill container 3602 is transferred from first refillable refill container 3602 to bulk refill storage container 3701. Dual station refillable refill system 3750 may be powered by any means, such as, for example, conventional outlet 3780 with the cord 3982 bringing 115 VAC to dual station refill system 3750. In some embodiments dual station refill system 3750 is powered by batteries. Dual station refill system 3750 also includes a second fluid Phil conduit 3766A and a second air vent conduit 3754A, which are connected to a connector 3752A and function in the same manner described above.

Figure 39:
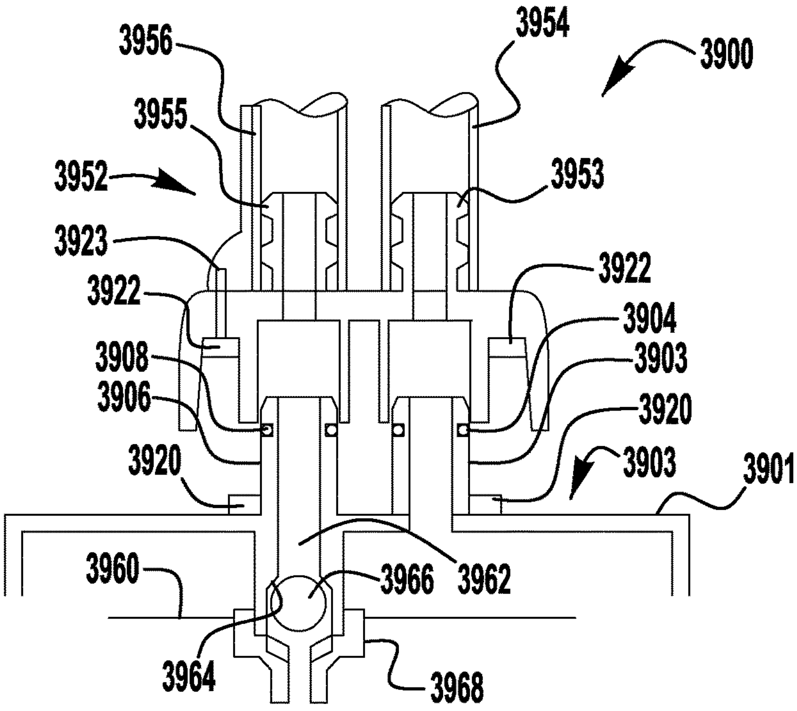
FIG. 39 is an exemplary connector with wireless communication circuitry.

FIG. 39 is an exemplary connector 3900 with wireless communication circuitry 3922. Connector 3900 is shown partially connected to mating connector 3902. Mating connector 3902 includes a liquid outlet 3903. Liquid outlet 3903 has a sealing member 3904, which may be, for example, and O-ring. Mating connector 3902 also contains an air Inlet connector 3706 which also has a sealing member 3908, which may be, for example, and O-ring. In addition mating connector 3902 includes wireless communication circuitry 3920 wireless communication circuitry 3920 may include read/write circuitry/memory (not shown). in some embodiments wireless communication circuitry 3920 may be an RFID. Wireless communication circuitry 3920 may contain the type of fluid in bulk refill storage container 3901, it may keep track of the amount of fluid remaining in bulk refill storage container 3901, and may contain other information such as for example, manufacturing date, volume of fluid in the container, batch number, ingredients, manufacturing location, and the like. Connector 3900 includes wireless communication circuitry 3922. Wireless communication circuitry 3922 may read information from wireless communication circuitry 3920. In some embodiments wireless communication circuitry 39 22 may write information to wireless communication circuitry 3920. In some exemplary embodiments wireless communication circuitry 3922 communicates to wireless medication circuitry 3920 the amount of fluid removed from bulk storage container 3901. Wireless medication circuitry 3920 may retain that information. In some embodiments wireless medication circuitry 3920 determines the amount of fluid left in bulk refill container 3901 and after the original volume of fluid in bulk refill container 3901 is depleted, wireless communication circuitry 39 20 may communicate to wireless communication circuitry 3922 that it's out of fluid, or if it's not out of fluid, there may have been an unauthorized refill in the bulk refill container 3901. Connector 3900 also includes a barbed outlet connector 3953 that connects to liquid outlet conduit 3954 and a barbed outlet connector 3955 that connects to vent air inlet conduit 3956. In some embodiments connector 3900 also includes valves (not shown) that prevent air and liquid from flowing out of or into connector 3900 when it is disconnected from mating connector 3902.

Mating connector 3902 may include a valve such as for example, ball valve having a float ball 33966 that blocks passage 3962 if liquid level 3960 is high enough to flow the ball valve into seat 3964. Looking at the bottom passage 3964 is retaining number 3968 that has ribs to allow air to flow into the container if the flow ball is sitting at the bottom of retaining member three 3968. In some embodiments mating connector 3902 includes one or more valves (not shown) that prevent air and liquid from flowing into or out of bulk storage container 3901 when connector 3900 is not connected.

Figure 40:
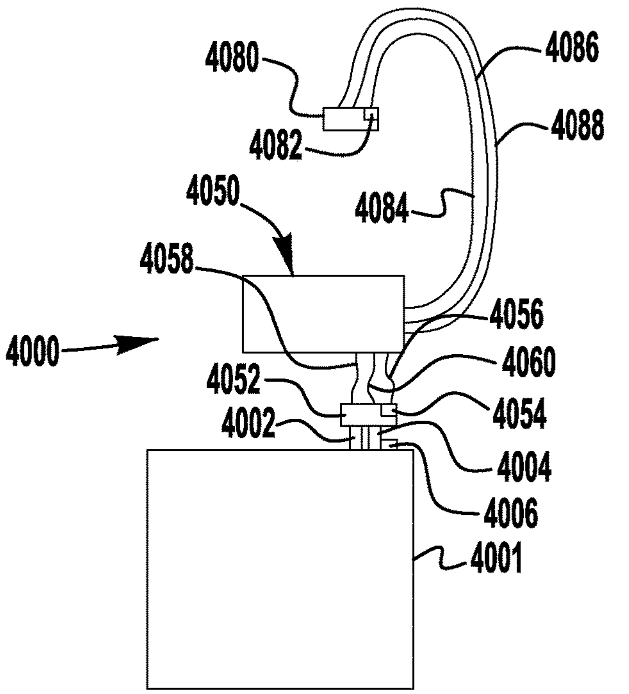
FIGS. 40-42 are exemplary schematic diagrams of sanitary bulk refill systems.
Figure 41:
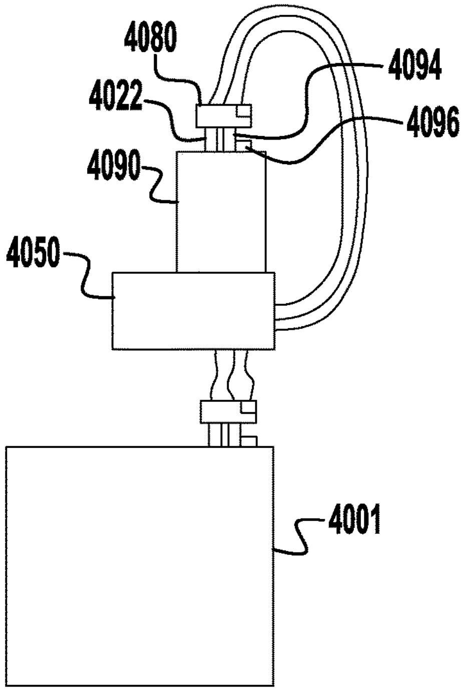
Figure 42:
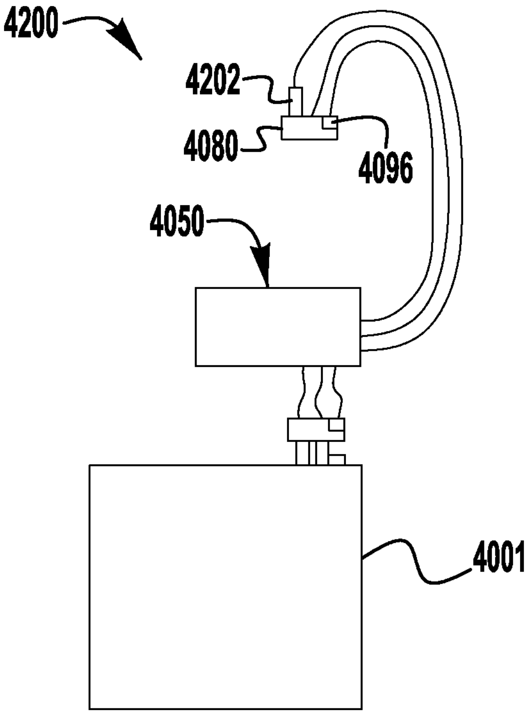

FIGS. 40 through 42 are exemplary schematic diagrams of a sanitary bulk refill system 4000. Bulk refill system for thousand includes a bulk storage container 4001 that has wireless communication circuitry 4006, a liquid outlet conduit 4004, and an air inlet conduit 4002. Bulk refill system 4000 includes a single refill refilling unit system 4050 that includes a connector 4052 having wireless communication circuitry 4054 and air outlet conduit 4058 a liquid inlet conduit 4060 a connector 4052 for connecting to the liquid outlet conduit 4004 and air Inlet, 4002. Single refill refilling unit system 4050 also has a connector 4080 for connecting to a refillable refill unit 4090 connector 4080 includes wireless communication circuitry 4282, connects to a fluid out let conduit 4086 and air vent conduit 4088. Single refill refilling unit system 4050 can communicate with bulk refill container 4001 as described above, as well as refillable refill unit 4090. The wireless communication circuitry 4096 on refillable refill unit 4090 may be similar to that disclosed above with relation to the bulk refill container 3901 and may be used to authenticate the refill unit 4090. It also may be used to ensure the correct fluid is placed in the refillable refill container 4090. The center bulk refill system 4200 is similar to the bulk refill system 4000 except for bulk refill system 4200 includes a filter 4202 in the event air system to filter air that's going to flow into the bulk storage container 4001. The filter may be any filter such as for example those described above.

Figure 43:
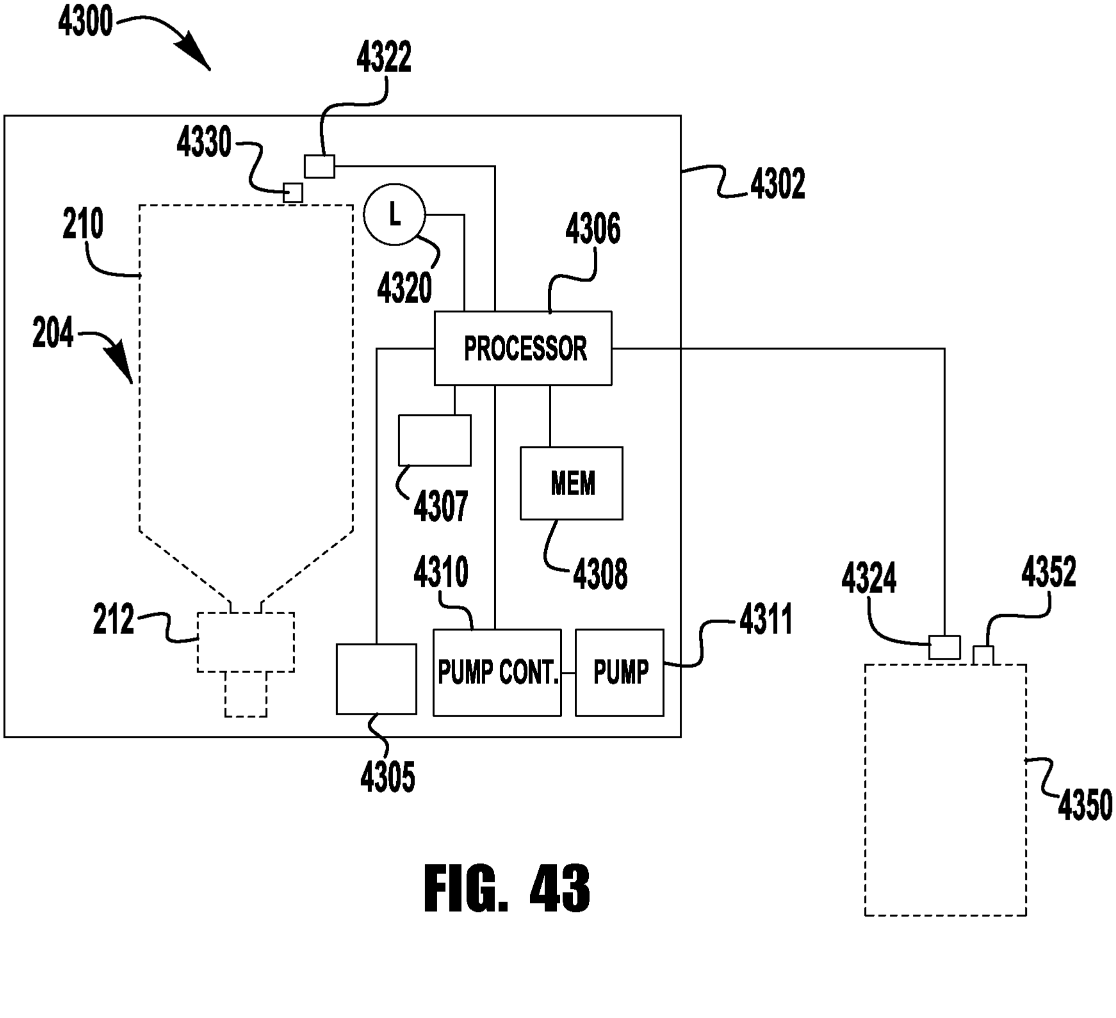
FIG. 43 is an exemplary embodiment of circuitry for a sanitary bulk refill system.

FIG. 43 is an exemplary embodiment of circuitry for a single refill refilling unit system 4300. Single refill refilling system 4300 includes a housing 4302. Located within housing 4302 is a processor 4306. Processor 4306 may be a microprocessor or the like. In circuit communication with processor 4306 is memory 4308, on/off switch 4305, pump control circuitry 4310, a level sensor 4320, first wireless communication circuitry 4322, and second wireless communication circuitry 4324. Pump control circuitry 4310 controls pump 4311 that pumps fluid from bulk storage tank 4350 in to refill unit 204. Refill unit 204 includes a pump 212 connected to a container 210 and third wireless communication circuitry 4320. Includes third wireless communication circuitry 4352 that may be read by second wireless communication circuitry 4324. Bulk refill storage tank 4350 includes fourth wireless communication circuitry 4352 that may be read by second wireless communication circuitry 4324. First and second wireless communication circuitry 4322, 4324 may be read only, or read/write circuitry.

First wireless communication circuitry 4322 may read inform from third wireless communication circuitry 4330 to determine, for example, whether the refill unit 204 is an authorized refill unit, how large the refill unit is, whether the dispenser (not shown) wrote data to third wireless communication circuitry 4330 that is indicative of a problem with refill unit 204, whether the refill unit 240 should be filled from the fluid in bulk storage refill tank 4350, the last time refill unit 204 was filled, how many times refill unit 204 has been refilled, the amount of fluid in refill unit 204 (which may be updated by the dispenser (not shown) each time fluid is dispensed), and the like. First wireless communication circuitry 4322 may write information to third wireless communication circuitry 4330, such as, for example, the type of fluid placed in refill unit 204, the time and date fluid is placed in refill unit 204, update the number of times the refill unit 204 has been refilled.

Similarly, second wireless communication circuitry 4324 may be read only, or may be read/write circuitry. Second wireless communication circuitry 4324 may read information from fourth wireless communication circuitry 4352, such as, for example, the size of bulk storage refill tank 4350, the type of fluid in bulk storage refill tank 4350, the amount of fluid in bulk storage refill tank 4350, The amount of fluid in bulk refill storage tank 4350 may be updated each time it is used to fill refill unit 204. In some embodiments, if processor 4306 determines that bulk storage refill tank 4350 should be depleted as a function of the amount of fluid removed from bulk storage refill tank 4350, the system 4300 may shut down preventing additional fluid from being pumped out of bulk storage refill tank 4350. Thus, this exemplary embodiment may be used to prevent unauthorized refilling of bulk storage refill tank 4350 with an unauthorized product.

In some embodiments, an indicator (not shown) is used to indicate that the refill unit 204 has been filled a set number of times and should be discarded to prevent failure from fatigue of the refill unit's components.

During operation, refill unit is placed in position and is connected to the refill connector (not shown). First wireless communication circuitry 4322 is placed in circuit communication with third wireless communication circuitry 4330. Bulk storage tank connector (not shown) is connected to bulk storage refill tank 4350 placing second wireless communication circuitry 4324 in circuit communication with fourth wireless communication circuitry 4352 and the user presses the on/off switch 4305. If the processor 4306 determines all parameters of the bulk refill storage tank 4350 and refill unit 204 are correct, the processor 4306 causes pump controller 4310 to operate pump 4311 to fill refill unit 204. When refill unit 204 is full, the pump controller 4310 causes pump 4311 to stop pumping. In some embodiments, processor 4306 determines the refill unit is full based upon a signal from level sensor 4320. Level sensor 4320, is generically used and may be any type of sensor that provides a signal indicative of the refill unit 204 being full to processor 4306.

Level sensor 4320 may be, for example, an optical level sensor, a weight sensor, an acoustic level sensor, logic that receives information indicative of the amount of fluid in refill unit 204 prior to refilling and the amount of fluid pumped into refill unit 204. In addition, the filling of refill unit 204 may be stopped manually by pushing the on/off switch 4305. Once refill unit 204 is filled and the pump 4311 is turned off, refill unit 204 may be disconnected and removed.

In some embodiments, refill refilling system 4300 includes an alcohol senor 4307 in circuitry communication with processor 4306. Alcohol sensor 4307 may be used to detect fluid that contains alcohol, such as, for example, the formulations incorporated herein above. In some embodiments, if the alcohol sensor 4307 does not detect alcohol in the liquid, the processor 4306 causes the pump 4311 to stop pumping. This may be used, for example, when the formulation is designed to include alcohol to reduce the risk of bacteria growing in the system.

Figure 44:
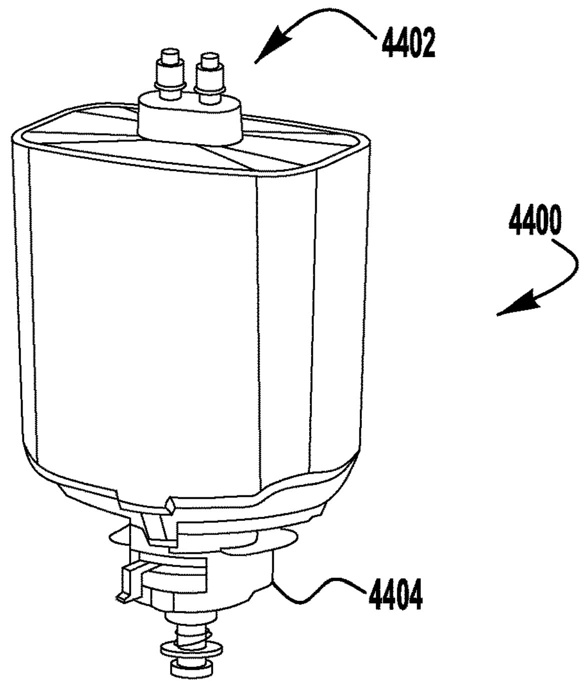
FIG. 44 is another exemplary embodiment of a refillable refill unit for a dispenser.

FIG. 44 is another exemplary embodiment of a refillable refill unit 4400 for a dispenser (not shown). Refill unit 4400 is similar to those described above except the connector 4402 is located on the top of the container 4403 opposite the pump 4404.

Figure 45:
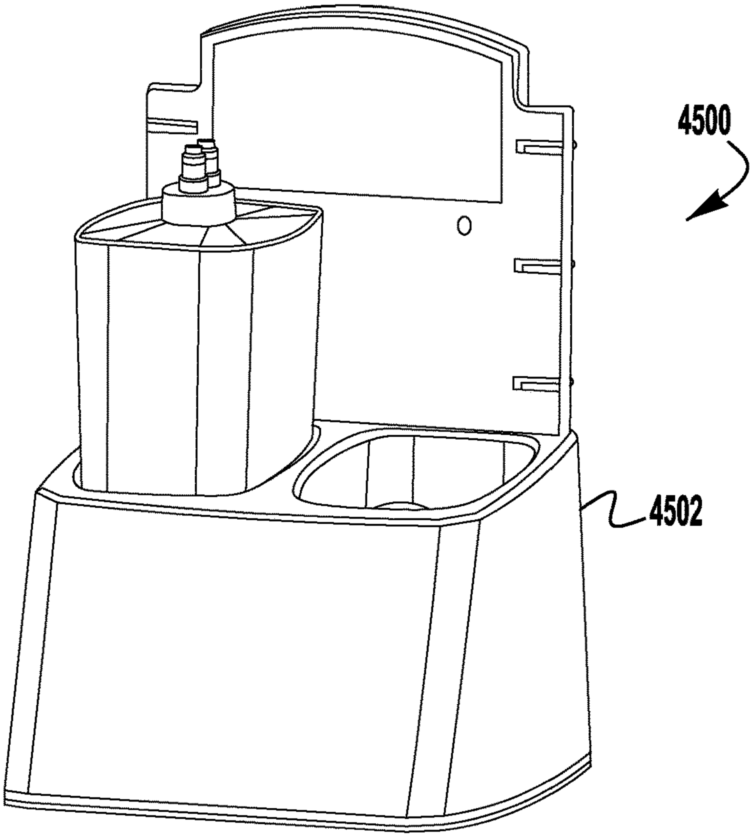
FIG. 45 is another exemplary embodiment of a refill unit refilling system.

FIG. 45 is another exemplary embodiment of a refill unit refilling system 4500. System 4500 is a dual refill refilling system and may operate in the manner of any of the systems described above.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. It is not the intention of the applicant to restrict or in any way limit the scope of the appended claims to such detail. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order in which the steps are presented to be construed as required or necessary unless expressly so stated.

We claim:

1. A refill for a soap or sanitizer dispenser comprising:
- a container;
- a neck located on a first end of the container and extending outward from the first end of the container;
- a first opening located at a distal end of the neck;
- a closure connected to the neck;
- the closure surrounding at least a portion of the neck;
- a second opening through at least a portion of the neck;
- a one-way valve in the a fluid flow path of the second opening;
- wherein the one-way valve allows fluid to flow through the second opening into the neck and into an interior of the container; and
- a vent tube extending upward from a third opening through the first end of the container to proximate a second end of the container to vent the container.

2. The refill of claim 1 wherein the vent tube extends upward from a vent.

3. The refill of claim 2 wherein the vent includes a vent valve.

4. The refill of claim 2 wherein the vent includes a vent valve and a filter.

5. The refill of claim 2 further comprising a pump, wherein the closure connects the pump to the container.

6. The dispenser of claim 5 wherein at least a portion of the pump passes through the first opening and is located at least partially in the neck.

7. The refill of claim 2 further comprising an annular projection surrounding the second opening and extending outward from the neck.

8. The refill of claim 2 comprising a one-way fluid outlet valve located in the flow path of the third opening.

9. A refill for a soap or sanitizer dispenser comprising:
- a container;
- a neck located on a first end of the container and extending outward from the first end of the container;
- a first opening located at a distal end of the neck;
- a closure connected to the neck;
- the closure surrounding at least a portion of the neck;
- a second opening through at least a portion of the neck;
- a one-way valve in a fluid flow path of the second opening;
- wherein the one-way valve allows fluid to flow through the second opening into the neck and into an interior of the container; and
- a vent tube extending upward from the first end of the container to proximate a second end of the container;
- wherein the vent tube extends upward from a vent; and
- wherein the refill is configured to be inserted into a dispenser, and wherein the dispenser includes a movable housing and wherein the refill is configured such that the second opening is located behind the movable housing when the dispenser is in an operating position and wherein the moveable housing is moved to expose the second opening to refill the refill unit.

10. A dispenser for dispensing soap or sanitizer comprising:
- a moveable housing;
- wherein the moveable housing is movable between a closed operating position and an open position;
- a receptacle;
- a pump;
- a container;
- wherein the container is received at least partially within the receptacle;
- a neck located on a first end of the container and extending outward from the first end of the container;
- a first opening located at a distal end of the neck;
- wherein liquid is removed from the container through the first opening;
- wherein when the housing is in its closed position, the first opening is located behind the housing and when the housing is in its open position, the first opening is configured to be placed in fluid communication with a liquid supply;
- a closure connected to the neck;
- the closure surrounding at least a portion of the neck;
- a second opening through at least a portion of the neck;
- a one-way valve in the fluid flow path of the second opening;
- wherein the one-way valve allows liquid to flow through the second opening into the neck and into an interior of the container; and
- a vent tube extending upward from a third opening in the first end of the container to proximate a second end of the container to vent the container.

11. The dispenser of claim 10 wherein the dispenser is configured so that air flows out of the container when liquid is pumped into the container and air flows into the container when liquid is pumped out of the container.

12. The dispenser of claim 10 wherein the vent tube extends upward from a vent.

13. The dispenser of claim 10 wherein the vent includes a vent valve.

14. The dispenser of claim 10 wherein the vent includes a vent valve and a filter.

15. A refill for a soap or sanitizer dispenser comprising:
- a container;
- a neck located on a first end of the container and extending outward from the first end of the container;
- a first opening located at a distal end of the neck;
- a closure connected to the neck;
- the closure surrounding at least a portion of the neck;
- a second opening through at least a portion of the neck;
- a one-way valve in a fluid flow path of the second opening;

wherein the one-way valve allows fluid to flow through the second opening into the neck and into an interior of the container; and a vent extending upward from a third opening in the first end of the container to proximate a second end of the container to vent the container; and a pump, wherein the closure connects the pump to the container.

16. The refill of claim 15 wherein a vent tube extends upward from the vent.

17. The refill of claim 16 wherein the vent includes a vent valve.

18. The dispenser of claim 15 wherein at least a portion of the pump passes through the first opening and is located at least partially in the neck.

19. The refill of claim 15 further comprising an annular projection surrounding the second opening and extending outward from the neck.

* * * * *